(12) United States Patent
Kim et al.

(10) Patent No.: US 11,353,707 B2
(45) Date of Patent: Jun. 7, 2022

(54) METHOD AND APPARATUS FOR PROCESSING SCREEN USING DEVICE

(71) Applicant: Samsung Electronics Co., Ltd., Suwon-si (KR)

(72) Inventors: Myung-sik Kim, Suwon-si (KR);
Su-jung Bae, Yongin-si (KR);
Moon-sik Jeong, Seongnam-si (KR);
Sung-do Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/090,361

(22) Filed: Nov. 5, 2020

(65) Prior Publication Data
US 2021/0048678 A1    Feb. 18, 2021

Related U.S. Application Data

(63) Continuation of application No. 16/411,666, filed on May 14, 2019, now Pat. No. 10,860,087, which is a (Continued)

(30) Foreign Application Priority Data

Oct. 15, 2014    (KR) .................. 10-2014-0139071

(51) Int. Cl.
*G02B 27/01*    (2006.01)
*G06F 1/16*    (2006.01)
(Continued)

(52) U.S. Cl.
CPC ......... *G02B 27/0172* (2013.01); *G06F 1/163* (2013.01); *G06F 1/1686* (2013.01);
(Continued)

(58) Field of Classification Search
USPC ........................................... 345/156
See application file for complete search history.

(56) References Cited

U.S. PATENT DOCUMENTS

| 8,412,355 B2 | 4/2013 | Hur |
| 9,098,223 B2 | 8/2015 | Shimizu et al. |

(Continued)

FOREIGN PATENT DOCUMENTS

| CN | 103460256 A | 12/2013 |
| CN | 104079748 A | 10/2014 |

(Continued)

OTHER PUBLICATIONS

Session 8: Hough Conversion, Lectures on Computer Visualization by Ching-han Chen, MS Program of Electronic Engineering of I-Shou University in fall, 2004, retrieved at http://ccy.dd.ncu.edu.tw/~chen/course/vision/ (2004).

(Continued)

*Primary Examiner* — Chineyere D Wills-Burns
(74) *Attorney, Agent, or Firm* — Jefferson IP Law, LLP

(57) ABSTRACT

A method and an apparatus for processing a screen by using a device are provided. The method includes obtaining, at the second device, a display screen displayed on the first device and information related to the display screen according to a screen display request regarding the first device, determining, at the second device, an additional screen based on the display screen on the first device and the information related to the display screen, and displaying the additional screen near the display screen on the first device.

20 Claims, 19 Drawing Sheets

Related U.S. Application Data continuation of application No. 14/873,761, filed on Oct. 2, 2015, now Pat. No. 10,331,205.

(51) Int. Cl.

| | |
|---|---|
| *G06F 3/00* | (2006.01) |
| *G06F 3/01* | (2006.01) |
| *G06F 3/0346* | (2013.01) |
| *G06F 3/041* | (2006.01) |
| *G06F 3/0482* | (2013.01) |
| *G06F 3/147* | (2006.01) |
| *G06T 19/00* | (2011.01) |
| *G06V 10/10* | (2022.01) |
| *G06V 10/20* | (2022.01) |
| *G06V 10/40* | (2022.01) |
| *G06V 20/20* | (2022.01) |
| *G06V 10/75* | (2022.01) |

(52) U.S. Cl.
CPC .............. *G06F 3/005* (2013.01); *G06F 3/011* (2013.01); *G06F 3/017* (2013.01); *G06F 3/0346* (2013.01); *G06F 3/0416* (2013.01); *G06F 3/0482* (2013.01); *G06F 3/147* (2013.01); *G06T 19/006* (2013.01); *G06V 10/10* (2022.01); *G06V 10/20* (2022.01); *G06V 10/40* (2022.01); *G06V 10/751* (2022.01); *G06V 20/20* (2022.01); *G02B 2027/014* (2013.01); *G02B 2027/0138* (2013.01); *G02B 2027/0178* (2013.01)

(56) References Cited

U.S. PATENT DOCUMENTS

| | | | |
|---|---|---|---|
| 9,384,594 B2 | 7/2016 | Maciocci et al. | |
| 9,766,785 B2 | 9/2017 | Lee et al. | |
| 10,001,647 B2 | 6/2018 | Han et al. | |
| 10,331,205 B2 | 6/2019 | Kim et al. | |
| 10,860,087 B2* | 12/2020 | Kim | G02B 27/0172 |
| 2005/0066165 A1* | 3/2005 | Peled | G06F 21/6245 |
| | | | 713/165 |
| 2006/0044265 A1 | 3/2006 | Min | |
| 2006/0061544 A1 | 3/2006 | Min et al. | |
| 2011/0037712 A1* | 2/2011 | Kim | G06F 3/0488 |
| | | | 345/173 |
| 2012/0092369 A1* | 4/2012 | Kim | G06T 19/006 |
| | | | 345/633 |
| 2012/0127284 A1* | 5/2012 | Bar-Zeev | G06T 19/006 |
| | | | 348/158 |
| 2012/0302289 A1* | 11/2012 | Kang | G06F 3/017 |
| | | | 455/557 |
| 2013/0011018 A1* | 1/2013 | Tateno | G01B 11/002 |
| | | | 901/14 |
| 2013/0016070 A1* | 1/2013 | Starner | G02B 27/017 |
| | | | 345/175 |
| 2013/0076865 A1 | 3/2013 | Tateno et al. | |
| 2013/0127980 A1* | 5/2013 | Haddick | G02B 27/0093 |
| | | | 348/14.08 |
| 2013/0147686 A1* | 6/2013 | Clavin | G02B 27/017 |
| | | | 345/8 |
| 2013/0194296 A1 | 8/2013 | Lee | |
| 2013/0335301 A1* | 12/2013 | Wong | G06F 3/013 |
| | | | 345/8 |
| 2013/0335303 A1* | 12/2013 | Maciocci | G06F 3/017 |
| | | | 345/8 |
| 2014/0111838 A1* | 4/2014 | Han | G02B 27/017 |
| | | | 359/13 |
| 2014/0125692 A1 | 5/2014 | Cheon et al. | |
| 2014/0198035 A1 | 7/2014 | Bailey et al. | |
| 2014/0285520 A1* | 9/2014 | Park | G06T 19/006 |
| | | | 345/633 |
| 2014/0306866 A1* | 10/2014 | Miller | G06T 1/20 |
| | | | 345/8 |
| 2014/0313863 A1* | 10/2014 | Lee | H04M 1/21 |
| | | | 368/10 |
| 2015/0020081 A1* | 1/2015 | Cho | G06F 9/546 |
| | | | 719/318 |
| 2015/0061997 A1* | 3/2015 | Chi | G08C 17/02 |
| | | | 345/156 |
| 2015/0302266 A1* | 10/2015 | Boncyk | G06V 10/40 |
| | | | 382/203 |
| 2015/0364113 A1* | 12/2015 | Ahn | G06F 1/1632 |
| | | | 345/156 |

FOREIGN PATENT DOCUMENTS

| | | |
|---|---|---|
| EP | 2 728 444 A2 | 5/2014 |
| KR | 10-2006-0026273 A | 3/2006 |
| KR | 10-2007-0090730 A | 9/2007 |
| KR | 10-2008-0107322 A | 12/2008 |
| KR | 10-2009-0040839 A | 4/2009 |
| KR | 10-0984937 B1 | 10/2010 |
| KR | 10-2011-0024435 A | 3/2011 |
| KR | 10-2013-0024615 A | 3/2013 |
| KR | 10-2013-0045002 A | 5/2013 |
| KR | 10-1310940 B1 | 9/2013 |
| KR | 10-2014-0052294 A | 5/2014 |
| WO | 2007/100204 A1 | 9/2007 |
| WO | 2013/145566 A1 | 10/2013 |

OTHER PUBLICATIONS

Taiwanese Office Action and Search Report dated Oct. 15, 2020, issued in Taiwanese Patent Application No. 108139749.
Taiwanese Office Action dated Mar. 27, 2020, issued in Taiwanese Application No. 108139749.
Taiwanese Office Action dated Mar. 27, 2020, issued in Taiwanese Application No. 104132907.
Taiwanese Office Action and Search Report dated Jan. 22, 2021, issued in Taiwanese Patent Application No. 108139749.
Taiwanese Decision to Refuse dated Apr. 29, 2021, issued in Taiwanese Patent Application No. 108139749.
Korean Notice of Allowance dated Oct. 29, 2021, issued in Korean Patent Application No. 10-2014-0139071.
Korean Notice Of Allowance dated Mar. 16, 2022, issued in Korean Application No. 10-2022-0012584.

* cited by examiner

METHOD AND APPARATUS FOR PROCESSING SCREEN USING DEVICE

CROSS-REFERENCE TO RELATED APPLICATION(S)

This application is a continuation application of prior application Ser. No. 16/411,666, filed on May 14, 2019, which is a continuation application of prior application Ser. No. 14/873,761, filed on Oct. 2, 2015, which issued as U.S. Pat. No. 10,331,205 on Jun. 25, 2019, which claimed priority under 35 U.S.C. § 119(a) of a Korean patent application number 10-2014-0139071, filed on Oct. 15, 2014, in the Korean Intellectual Property Office, the disclosure of which is incorporated by reference herein in its entirety.

TECHNICAL FIELD

The present disclosure relates to methods and apparatuses for processing a screen linked between devices.

BACKGROUND

In general, mobile devices are computer devices that are small-sized enough to be fit in a pocket and include a display screen having a touch input function or a small-sized keyboard. However, the screen of such a mobile device is often smaller than the sizes of contents provided thereto, and thus a window should be additionally displayed or screen scrolling should be performed. Head-mounted display (HMD) devices should be understood as various image display devices designed for users to view a virtual image while wearing the HMD devices on their heads like eyeglasses. The HMD devices are capable of providing users with not only a simple display function but also with various convenient functions which are combinations of a display function with augmented reality technology, N-screen technology, etc. However, a user of an HMD device should indirectly attempt to control a virtual image displayed on glasses of the HMD device, for example, by making a gesture toward the virtual image, making a voice input, or touching the arms of the eyeglasses without physically touching the virtual image. Thus, the virtual image is difficult to be precisely controlled.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above mentioned problems and/or disadvantages and to provide at least the advantages described below. Accordingly, an aspect of the present disclosure is to provide methods and apparatuses for processing an additional screen linked to an actual screen by using a device.

In accordance with an aspect of the present disclosure, a method of processing a screen on a first device, which is performed by a second device, is provided. The method includes obtaining, at the second device, a display screen displayed on the first device and information related to the display screen according to a screen display request regarding the first device, determining, at the second device, an additional screen based on the display screen on the first device and the information related to the display screen, and displaying the additional screen near the display screen on the first device.

The information related to the display screen may include at least one of shape information of the first device, a location of the additional screen to be displayed near the display screen on the first device, a size of the additional screen, content information related to the additional screen, and state information of the first device captured using a camera.

The state information of the first device may include a location and angle of a screen of the first device.

The state information of the first device may be periodically updated using the camera.

The displaying of the additional screen may include capturing an image of the first device, determining a location and direction of a screen of the first device based on the captured image of the first device, and displaying the additional screen on a predetermined location on the screen of the first device, based on the location and direction of the screen of the first device.

The determining of the location and direction of the screen of the first device may include receiving shape information of the first device from the first device, extracting feature points from the shape information of the first device, and comparing feature points of the image of the first device with the feature points of the shape information of the first device to determine the location and direction of the screen of the first device.

The method may further include controlling the display screen on the first device and the additional screen to be linked to each other according to user inputs performed on the first and second devices.

The controlling of the display screen on the first device and the additional screen to be linked to each other may include controlling the display screen on the first device and the additional screen on the second device to be linked to each other according to the user inputs performed on the respective first and second devices.

The controlling of the display screen on the first device and the additional screen to be linked to each other may include recognizing a command to end the additional screen according to a user input received from the first device, and ending the additional screen by transmitting the command to end the additional screen to the second device.

The controlling of the display screen on the first device and the additional screen to be linked to each other may include recognizing a user input on the additional screen on the second device by using a camera, and ending the additional screen and transmitting information indicating the end of the additional screen to the first device when the user input is recognized.

In accordance with another aspect of the present disclosure, a method of processing a screen by using a first device comprising an object, which is performed by a second device, is provided. The method includes recognizing, at the second device, the object by receiving information related to the object from the first device, and transmitting information indicating a result of recognizing the object to the first device, obtaining, at the second device, information regarding a display screen related to the recognized object according to an additional screen display request regarding the first device, determining, at the second device, an additional screen to be displayed on a predetermined location on the object, based on the information regarding the display screen related to the object, and displaying the additional screen on the predetermined location on the object.

The method may further include obtaining information regarding the display region which is set on a predetermined location on the object from the first device.

The information regarding the display screen related to the object may include shape information of the object, a location and direction of the additional screen to be displayed on the object, a size of the additional screen, content information related to the additional screen, and state information of the object captured using a camera.

The state information of the object may include a location and angle of the object.

The state information of the object may be periodically updated using the camera.

The displaying of the additional screen may include capturing an image of the object by using a camera, extracting information regarding a location and angle of the object from the captured image of the object, and determining a location and direction in which the additional screen is to be displayed, based on the location and angle of the object.

The extracting of the information regarding the location and angle of the object may include receiving shape information of the object from the first device, extracting feature points from the shape information of the object, and comparing the feature points of the shape information of the object with feature points of the captured image of the object to extract the information regarding the location and angle of the object.

In accordance with yet another aspect of the present disclosure, a method of processing an additional screen by using a first device, which is performed by a second device, is provided. The method includes obtaining, at the second device, information regarding the additional screen and state information of the first device according to a screen display request regarding the first device, determining, at the second device, a location on which the additional screen is to be displayed, based on the information regarding the additional screen and the state information of the first device, displaying the additional screen on the determined location, and controlling the first and second devices to be linked to each other according to a user input related to the additional screen.

In accordance with still another aspect of the present disclosure, a method of processing a screen on a second device, which is performed by a first device, is provided. The method includes transmitting, at the first device, a display screen and information related to the display screen to the second device according to a screen display request, receiving, at the first device, control information regarding an additional screen displayed on the second device from the second device, and updating, at the first device, the information related to the display screen according to the control information.

The information related to the display screen may include a location of the additional screen to be displayed near the display screen on the device, a size of the additional screen, and content information related to the additional screen.

In accordance with yet still another aspect of the present disclosure, an apparatus for processing a screen by using a device is provided. The apparatus includes a display unit configured to display an image, a communication unit configured to receive a display screen on the device and information related to the display screen according to a screen display request regarding the device, and a control unit configured to obtain an additional screen based on the information related to the display screen obtained by the communication unit, display the additional screen on the display unit such that the additional screen is displayed near the display screen on the device, and control the display screen on the device and the additional screen to be linked to each other according to a user input.

The control unit may photograph a shape of the device by using a camera, extract information regarding a location and angle of a screen of the device from state information based on the shape of the device, and determine a region in which the additional screen is to be displayed, based on the location and angle of the screen of the device.

The control unit may control the display screen on the device and the additional screen to be linked to each other according to a user input performed on the device and a user input related to the additional screen.

The control unit may recognize a user input on the additional screen through the camera, ends the additional screen when the user input instructs to end the additional screen, and transmits information informing the end of the additional screen to the device.

In accordance with still yet another aspect of the present disclosure, a non-transitory computer-readable recording medium is provided. The recording medium has recorded thereon at least one program including instructions for performing a method of processing a screen on a first device, performed by a second device. The method includes obtaining, at the second device, a display screen displayed on the first device and information related to the display screen according to a screen display request regarding the first device, determining, at the second device, an additional screen based on the information related to the display screen, and displaying the additional screen near the display screen on the first device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
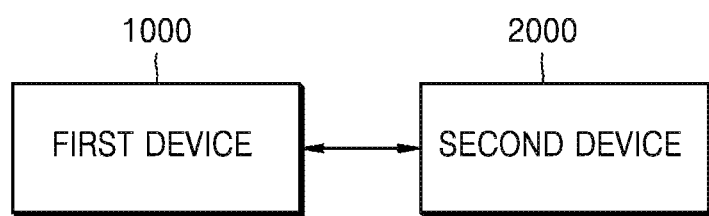
FIG. 1 is a block diagram of is a block diagram of a system configured to process a screen between a first device and a second device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that, although the terms 'first', 'second', 'third', etc., may be used herein to describe various elements, components, regions, layers and/or sections, these elements, components, regions, layers and/or sections should not be limited by these terms. These terms are only used to distinguish one element, component, region, layer or section from another region, layer or section.

The specific terms used in the present disclosure are not intended to restrict the scope of the present disclosure and only used for a better understanding of (to facilitate the understanding of) various embodiments of the present disclosure. In the present disclosure, general terms that have been widely used nowadays are selected, if possible, in consideration of functions of the present disclosure, but non-general terms may be selected according to the intentions of technicians in the this art, precedents, or new technologies, etc. Some terms may be arbitrarily chosen by the present applicant. In this case, the meanings of these terms will be explained in corresponding parts of the present disclosure in detail. Thus, the terms used herein should be defined not based on the names thereof but based on the meanings thereof and the whole context of the present disclosure.

It will be further understood that the terms 'comprise' and/or 'comprising,' when used in this specification, specify the presence of stated features, integers, operations, elements, and/or components, but do not preclude the presence or addition of one or more other features, integers, operations, elements, components, and/or groups thereof. As used herein, the term 'and/or' includes any and all combinations of one or more of the associated listed items. Expressions such as 'at least one of,' when preceding a list of elements, modify the entire list of elements and do not modify the individual elements of the list.

FIG. 1 is a block diagram of a system configured to process screen information between a first device and a second device according to an embodiment of the present disclosure.

Referring to FIG. 1, the first device 1000 may request the second device 2000 to display an additional screen, and process the additional screen according to a control command and screen information received from the second device 2000. Here, the additional screen may be a virtual image linked to a main screen.

Examples of the first device 1000 may include, but are not limited to, a wearable terminal, a smart phone, a personal computer (PC), a tablet PC, a mobile phone, a smart television (TV), a personal digital assistant (PDA), a laptop computer, a media player, a global positioning system (GPS) device, an electronic book terminal, a digital broadcasting terminal, a navigation device, a kiosk, a Motion Picture Experts Group phase 1 or phase 2 (MPEG-1 or MPEG-2) audio layer 3 (MP3) player, a digital camera, and other mobile or non-mobile computing devices. The first device 1000 may include various devices capable of receiving a touch input, e.g., an electronic bulletin board, a touch table, etc. The first device 1000 may include a display or may not include a display.

Also, the first device 1000 may have a communication function and a data processing function but is not limited thereto. The first device 1000 includes various devices capable of receiving information from the second device 2000 via a network and executing the information.

The second device 2000 may receive information regarding an additional screen together with a screen display request from the first device 1000. The screen display request may be generated by the first device 1000 or the second device 2000 according to a user input. The second device 2000 may capture an image of the first device 1000 through a camera, and analyze a state of the first device 1000 based on the image. The second device 2000 may determine a location and a direction in which the additional screen is to be displayed, based on state information of the first device 1000 and the information regarding the additional screen. The second device 2000 may display the additional screen to be linked to a screen on the first device 1000. The second device 2000 may control the additional screen to be linked to a screen on the first device 1000 according to a user input. In this case, the user input for the second device 2000 may be a touch input or a button input which is input by a user but is not limited thereto.

According to an embodiment of the present disclosure, the second device 2000 may capture an image of the shape of the first device 1000 by using a camera and transmit the image of the shape to the first device 1000. The first device 1000 determines a region or a location in which the additional screen is to be displayed, based on the image of the shape of the first device 1000, and transmit to the second device 2000 information regarding the region or the location in which the additional screen is to be displayed.

Examples of the second device 2000 may include, but are not limited to, a head-mounted display (HMD), a PC, a smart TV, a digital broadcasting terminal, and other mobile/non-mobile computing devices. The second device 2000 may include various devices capable of receiving a touch input, e.g., an electronic bulletin board, a touch table, etc.

The second device 2000 may display the additional screen on a display thereof in a form of augmented reality (AR), mixed reality (MR), or virtual reality (VR).

The second device 2000 may display a virtual screen on a transparent or a non-transparent display.

The second device 2000 may be eyeglasses or a device worn on the body such as a hand band having a communication function and a data processing function, but is not limited thereto.

The first device 1000 and the second device 2000 may be connected via a network. The network may be a wire network such as a local area network (LAN), a wide area network (WAN) or a value-added network (VAN), or various types of wireless network such as a mobile radio communication network or a satellite communication network.

As described above, according to various embodiments of the present disclosure, various visual information may be provided by exposing, on the screen of the second device, information related to an actual screen displayed on the first device 1000 using a user input for the second device 2000 while a user views the first device 1000 using the second device 2000, and a convenient interactive environment may be provided by alternately controlling a virtual screen and the actual screen.

Figure 2:
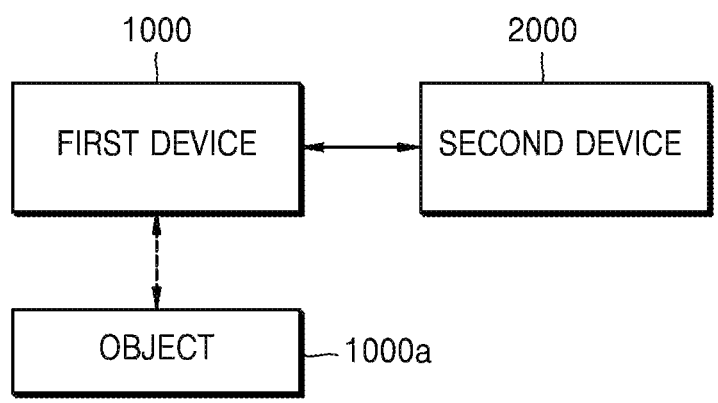
FIG. 2 is a block diagram of a system configured to process a screen between a first device and a second device according to an embodiment of the present disclosure.

FIG. 2 is a block diagram of a system configured to process a screen between a first device and a second device according to an embodiment of the present disclosure.

The first device 1000 may additionally include an object 1000*a* having limited functions or having no function. According to an embodiment of the present disclosure, the object 1000*a* may be either a band having at least a control function and a sensor function, or a wrist band or a sticker having no function.

For example, a user may wear the object 1000*a*, such as a band having limited functions, on his or her wrist, and the first device 1000 may be a separate device that may be out of sight or a device or an application which is present in a network.

According to an embodiment of the present disclosure, if the first device 1000 sets, as a display region, a human wrist or a natural object such as white paper of a diary or wallpaper, the second device 2000 informs the first device 1000 of a natural object recognition event, and displays an additional screen on a location corresponding to the natural object according to a request for the additional screen, which is received from the first device 1000, when the second device 2000 recognizes the natural object using a camera.

According to an embodiment of the present disclosure, the first device 1000 may designate an object, based on a captured image. The second device 2000 may receive captured image information from the first device 1000, and determine a location on which an additional screen is to be displayed. For example, when the first device 1000 captures an image of a user's wrist and designates the image of the user's wrist as an object, the second device 2000 displays a virtual watch on the image of the user's wrist. When the first device 1000 captures an image of a blank note and designates the image of the blank note as an object, the second device 2000 may display a virtual tablet PC on the image of the blank image.

Figure 3:
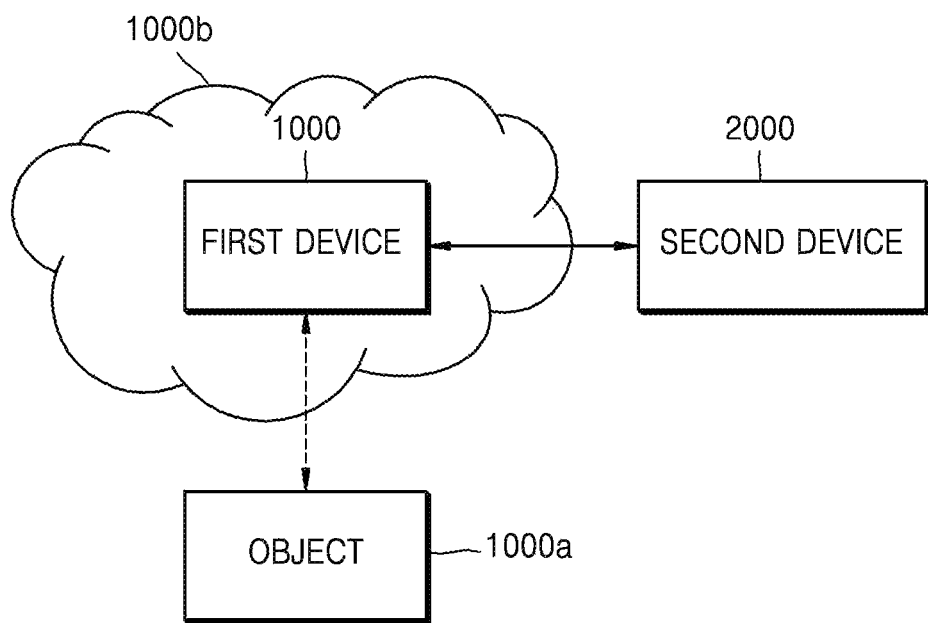
FIG. 3 is a block diagram of a system configured to process a screen between a first device and a second device according to an embodiment of the present disclosure.

FIG. 3 is a block diagram of a system configured to process a screen between a first device and a second device according to an embodiment of the present disclosure.

Referring to FIG. 3, the first device 1000 may be a device or an application which is present in a cloud 1000*b*. The first device 1000 present in the cloud 1000*b* may additionally include an object 1000*a*.

Figure 4:
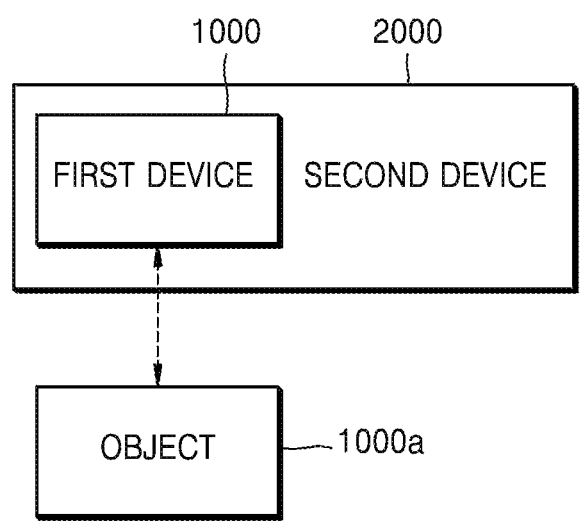
FIG. 4 is a block diagram of a system configured to process a screen between a first device and a second device according to an embodiment of the present disclosure.

FIG. 4 is a block diagram of a system configured to process a screen between a first device and a second device according to an embodiment of the present disclosure.

Referring to FIG. 4, the first device 1000 may be a control device or an application which is present in the second device 2000. The first device 1000 present in the second device 2000 may additionally include an object 1000*a*.

Figure 5:
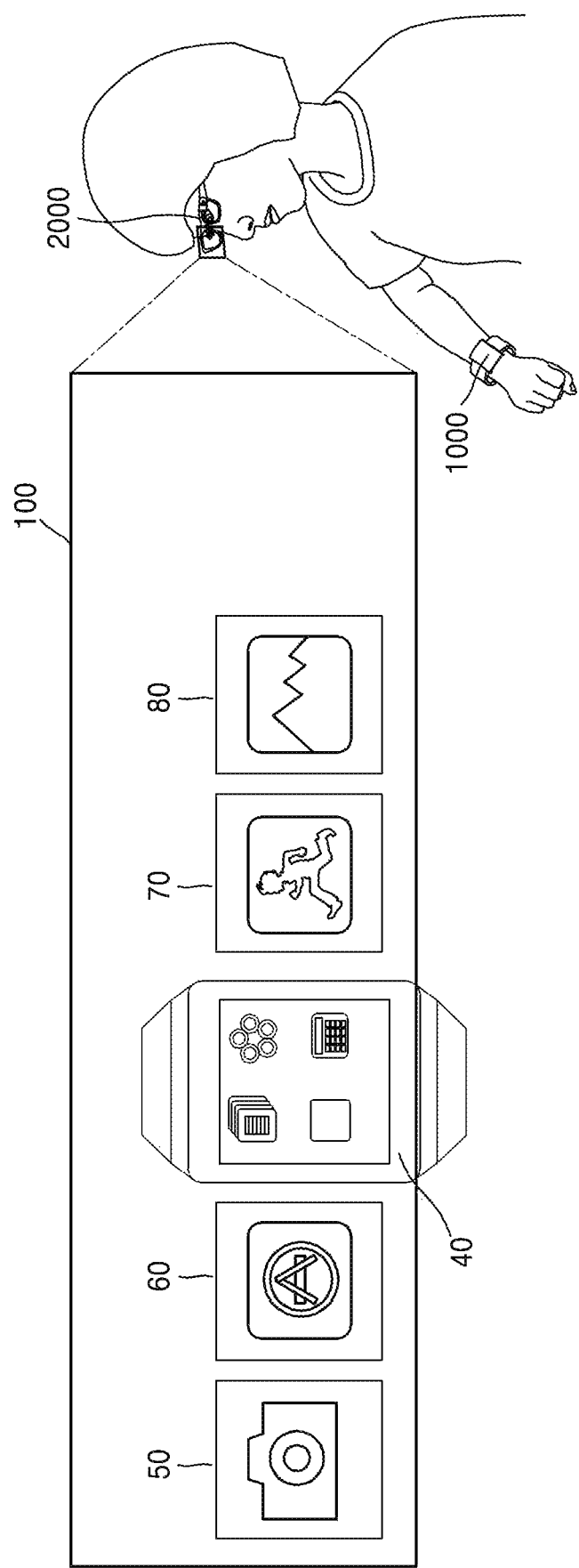
FIG. 5 is a diagram illustrating a case in which a second device processes an additional screen to be linked to a screen on a first device according to an embodiment of the present disclosure.

FIG. 5 is a diagram illustrating a case in which a second device 2000 processes an additional screen to be linked to a screen of a first device 1000 according to an embodiment of the present disclosure.

According to an embodiment of the present disclosure, the first device 1000 may be a mobile device and the second device 2000 may be an eyeglasses type HMD.

According to an embodiment of the present disclosure, the eyeglass type HMD may include a lens via which an actual space is viewed, and a display unit attached to a location on the lens and configured to display a virtual image. The eyeglass type HMD will be described in more detail with reference to FIG. 22 below.

FIG. 5 illustrates a glass screen that is a combination of an actual screen that comes into a user's view via an eyeglass type HMD and a virtual image.

The glass screen 100 means a screen that a user views via the lens and the display unit of the HMD.

Referring to FIG. 5, a user may view a display screen 40 that is actually displayed on the first device 1000, and additional screens 50, 60, 70, and 80 displayed on the second device 2000 by using the HMD. Here, the display screen 40 displayed on the first device 1000 is an actual screen viewed via the lens of the HMD, and the additional screens 50, 60, 70, and 80 displayed on the second device 2000 are virtual images viewed near the first device 1000 via the display unit of the HMD.

That is, on the glass screen 100 of the second device 200, the display screen 40 displayed on the first device 1000 is displayed and the additional screens 50, 60, 70, and 80 are displayed near the display screen 40.

Thus, a user would feel as if the display screen 40 displayed on the first device 1000 and the additional screens 50, 60, 70, and 80 were displayed on the second device 2000.

According to an embodiment of the present disclosure, when the second device 2000 displays additional screens via the first device 1000 on which nothing is displayed, the second device 2000 may display a virtual watch image on a surface of the first device 1000, and display virtual application folder icons at the left and right sides of the virtual watch image.

Figure 6:
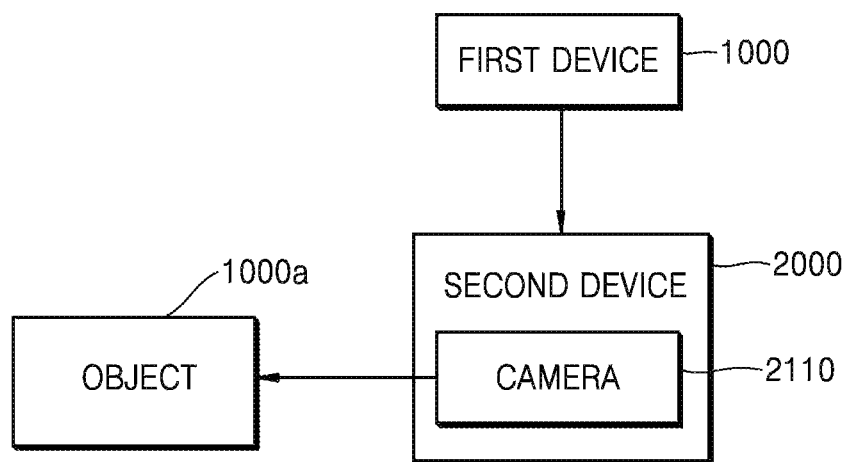
FIG. 6 is a diagram illustrating a case in which a second device displays a virtual image type additional screen around an object according to an embodiment of the present disclosure.

FIG. 6 is a diagram illustrating a case in which a second device displays a virtual image type additional screen around an object according to an embodiment of the present disclosure.

Referring to FIG. 6, a first device may additionally include an object 1000a having limited functions or having no function. The first device 1000 may transmit object-related information to the second device 2000.

The second device 2000 obtains predetermined object-related information from the first device 1000. The second device 2000 recognizes the object 1000a using a camera 2110 based on the object-related information, and informs the first device 1000 of information containing a result of recognizing the object 1000a. The second device 2000 obtains display information related to the object 1000a according to a screen display request received from the first device 1000. The second device 2000 determines an additional screen to be displayed on a predetermined location on a captured image of the object 1000a based on the display information. The second device 2000 may display the additional screen on a location corresponding to the image of the object 1000a.

Figure 7:
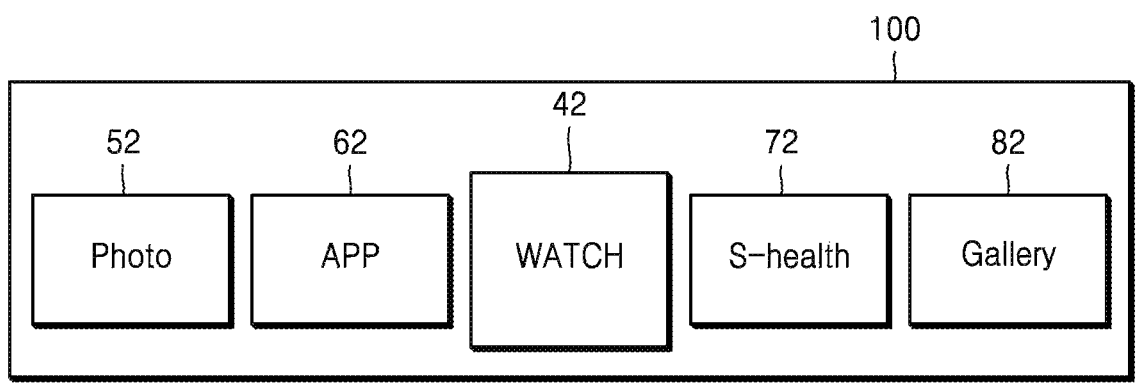
FIG. 7 is a diagram illustrating a case in which a second device displays additional screens to be linked to an object according to an embodiment of the present disclosure.

FIG. 7 is a diagram illustrating a case in which a second device displays additional screens to be linked to an object according to an embodiment of the present disclosure.

Referring to FIG. 7, a plurality of additional screens 52, 62, 72, and 82 are displayed on a glass screen 100 on the second device 2000 to be linked to an object 42 that is in the form of an actual watch. According to an embodiment of the present disclosure, the additional screens 52, 62, 72, and 82 may be virtual images displayed on a screen of an HMD. Here, the object 42 that is in the form of an actual watch is an image of an actual watch viewed via a lens of the HMD, and the additional screens 52, 62, 72, and 82 are virtual images viewed near the image of the actual watch via a display unit of the HMD.

A user would feel as if the additional screens 52, 62, 72, and 82 were displayed near the object 42 of the first device 1000 via the second device 2000.

Figure 8:
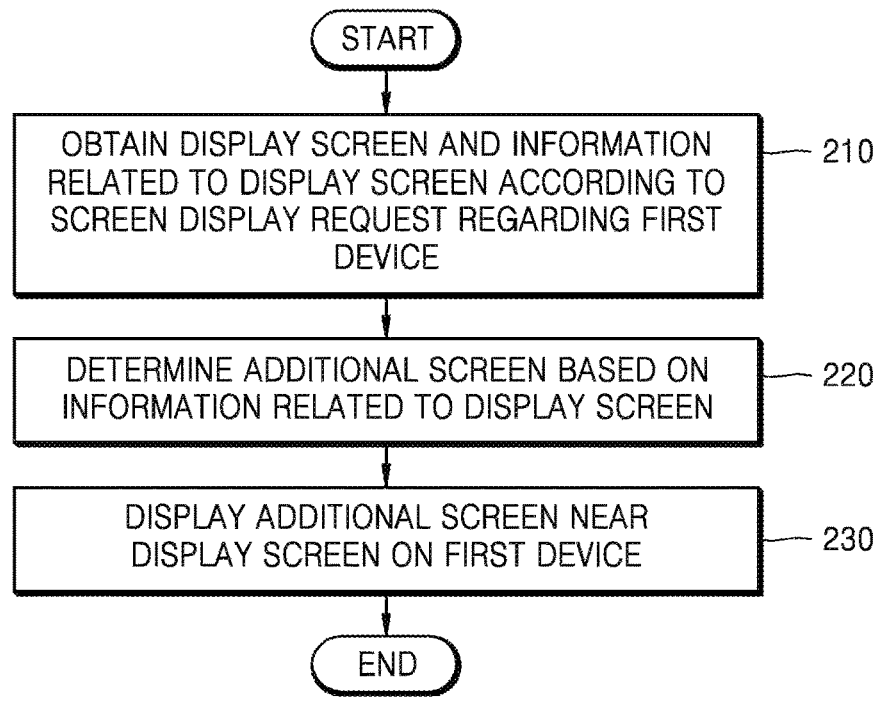
FIG. 8 is a flowchart of a method of processing a screen linked to a screen displayed on a first device, performed by a second device, according to an embodiment of the present disclosure.

FIG. 8 is a flowchart of a method of processing screen information linked to a screen displayed on a first device, performed by a second device, according to an embodiment of the present disclosure.

Referring to FIGS. 1 and 8, in operation 210, the second device 2000 obtains a display screen displayed on the first device 1000 and information related to the display screen according to a screen display request regarding the first device 1000. For example, the information related to the display screen may include information regarding a location of additional screens to be displayed near the display screen on the first device 1000, the sizes of the additional screens, the contents of the additional screens, and state information of the first device 1000 captured using a camera. According to an embodiment of the present disclosure, the additional screens may be virtual images displayed on a screen of an HMD.

In this case, the screen display request regarding the first device 1000 may be generated by the first device 1000 or the second device 2000 according to a user input. According to an embodiment of the present disclosure, the screen display request regarding the first device 1000 may be transmitted by connecting the first device 1000 and the second device 2000 via a network or recognizing the first device 1000 using a camera of the second device 2000 but is not limited thereto.

The first device 1000 may select a menu and generate a command to display additional screens related to the menu according to a user input such as a gesture, a touch, or voice. The second device 2000 may receive the command to display additional screens related to the menu from the first device 1000. Also, the second device 2000 may receive additional screens related to a menu that are set beforehand by the first device 1000. The additional screens may be, for example, a plurality of virtual images (such as "PHOTO", "APP", S-health", and "Gallery") which are not displayed on a screen of the first device 1000 due to space restraints of the first device 1000. Examples of the additional screens may include various types of screens that may be displayed on the screen of the first device 1000.

Also, the second device 2000 captures an image of a shape of the first device 1000 using a camera. The second device 2000 may photograph the first device 1000 to determine the location and angle of the screen on the first device 1000 by using a camera, and receive, in real time, an image of the shape of the first device 1000 captured by the camera.

In operation 220, the second device 2000 determines additional screens to be displayed near the display screen on the first device 1000, based on the information related to the display screen on the first device 1000.

In operation 230, the second device 2000 displays the additional screens near the display screen on the first device 1000. According to an embodiment of the present disclosure, the second device 2000 may display the additional screens on predetermined locations near the display screen on the first device 1000. The second device 2000 may determine locations and directions in which the additional screens are to be displayed, based on captured shape information of the first device 1000 and the information related to the display screen on the first device 1000. In a method of determining locations and directions in which additional screens are to be displayed according to an embodiment of the present disclosure, the second device 2000 may recognize the shape of the first device 1000 photographed by a camera, extract information regarding the location and angle of a screen of the first device 1000 from information regarding the shape of the first device 1000, and determine locations and directions corresponding to regions in which the additional screens are to be displayed, based on the location and angle of the screen of the first device 1000. According to an embodiment of the present disclosure, the second device 2000 may photograph the display screen on the first device 1000 by using the camera, and display the display screen and the determined additional screens.

Accordingly, according to an embodiment of the present disclosure, a user may view, via the second device 2000, the display screen displayed on the first device 1000 and the additional screens displayed on the second device 2000.

Figure 9:
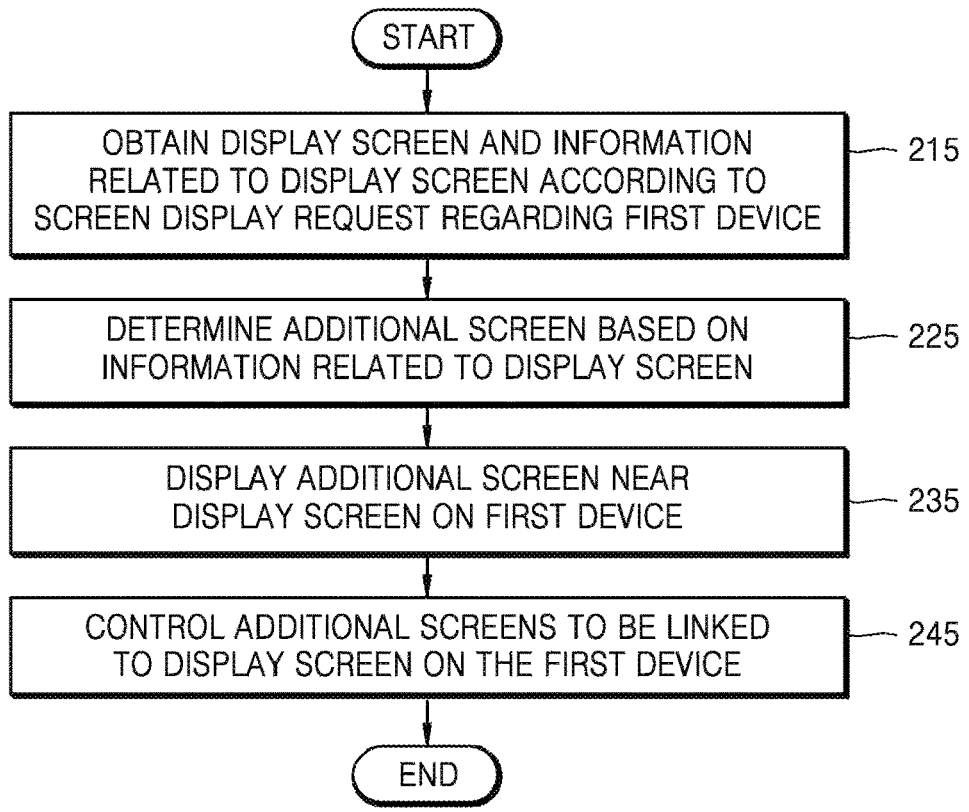
FIG. 9 is a flowchart of a method of processing a screen linked to a screen displayed on a first device, performed by a second device, according to an embodiment of the present disclosure.

FIG. 9 is a flowchart of a method of processing a screen linked to a screen displayed on a first device, performed by a second device, according to an embodiment of the present disclosure.

In FIG. 9, operations 215, 225, and 235 are substantially the same as operations 210, 220, and 230 of FIG. 4 and are not thus described here again.

Referring to FIGS. 1 and 9, in operation 245, the second device 2000 controls additional screens to be linked to a display screen displayed on the first device 1000. The additional screens on the second device 2000 and the display screen on the first device 1000 are controlled to be linked to one another. A user may change a screen of the first device 1000 by manipulating the additional screens on the second device 2000 or change the additional screens on the second device 2000 by selecting a menu of the first device 1000. The second device 2000 may control the additional screens thereof to be linked to the display screen on the first device 1000 according to a user input that is input for the first device 1000 or that is input by performing a camera recognition gesture on the second device 2000. In this case, the user input for the first device 1000 may be input by performing a specific gesture, a touch input, or a voice input by a user, but is not limited thereto. The user input for the second device 2000 may be input by performing a camera recognition gesture, a touch input, a button input, or a voice input, but is not limited thereto. For example, when a 'Gallery' menu on an additional screen displayed to be linked to the display screen on the first device 1000 is touched by performing a specific gesture, the 'Gallery' menu may be displayed on the display screen on the first device 1000. Also, the first device 1000 may end the additional screen by transmitting a command to end the additional screen to the second device 2000. The second device 2000 may end the additional screen when a user input is recognized on the additional screen via a camera, and transmit information indicating the end of the additional screen to the first device 1000. When the first device 1000 receives the information indicating the end of the additional screen from the second device 2000, the first device 1000 may display a result of processing a result of processing the additional screen on an actual screen. According to an embodiment of the present disclosure, when the second device 2000 is an HMD, examples of a gesture performed on the additional screen may include a touch gesture performed by touching the additional screen, and a motion gesture performed, for example, by drawing an 'X' on the additional screen.

Figure 10:
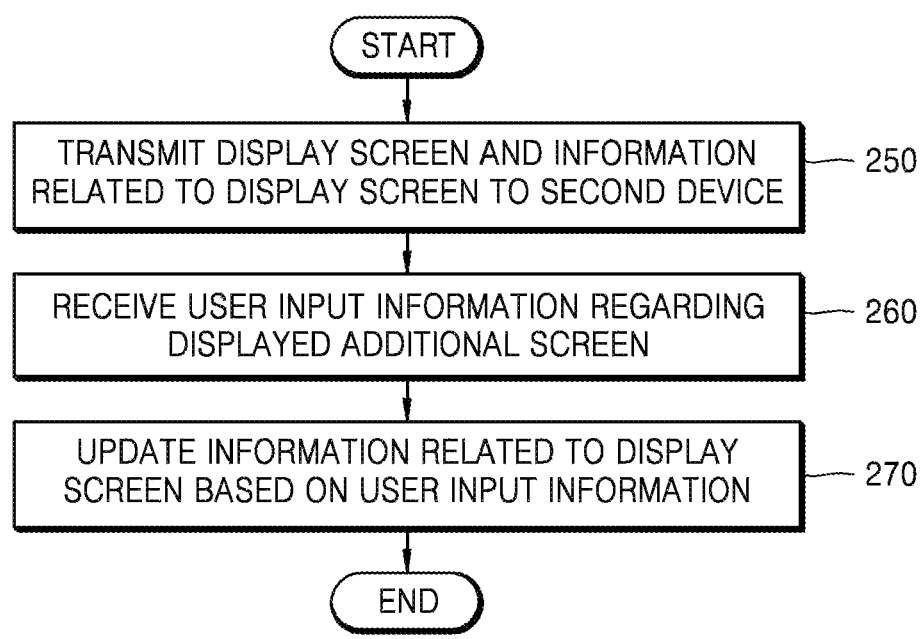
FIG. 10 is a flowchart of a method of processing a screen displayed on a second device, performed by a first device, according to an embodiment of the present disclosure.

FIG. 10 is a flowchart of a method of processing a screen displayed on a second device, performed by a first device, according to an embodiment of the present disclosure.

Referring to FIGS. 1 and 10, in operation 250, the first device 1000 transmits a display screen and information related to the display screen to the second device 2000 according to a user input requesting a screen to be displayed. The information related to the display screen may include a location and direction in which an additional screen is to be exposed near the display screen on the first device 1000, the size of the additional screen, and contents information related to the additional screen. According to an embodiment of the present disclosure, the additional screen may be a virtual image displayed on a screen of an HMD.

In operation 260, the first device 1000 receives user input information regarding the additional screen from the second device 2000. For example, the first device 1000 receives information for selecting the additional screen from the second device 2000.

In operation 270, the first device 1000 updates the information related to the display screen of the first device 1000, based on the user input information received from the second device 2000. For example, the first device 1000 may update the display screen linked to the additional screen selected by the second device 2000.

Figure 11:
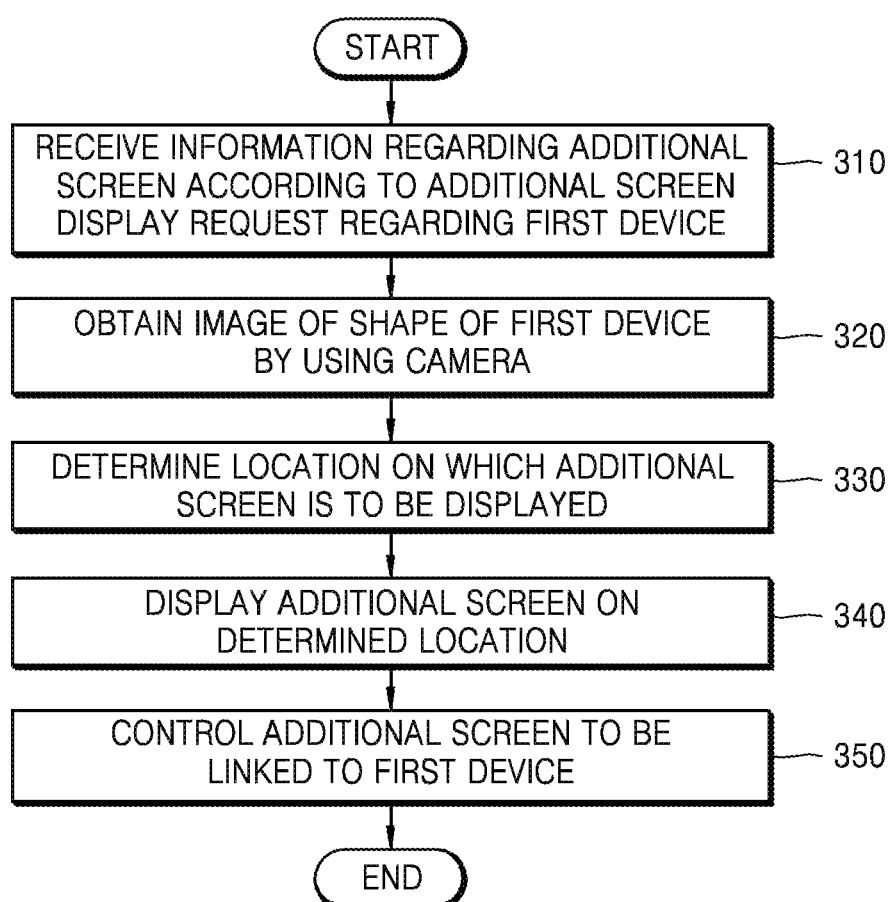
FIG. 11 is a flowchart of a method of processing a screen by using first device on which no screen is displayed, performed by a second device, according to an embodiment of the present disclosure.

FIG. 11 is a flowchart of a method of processing a screen by using a first device on which no screen is displayed, performed by a second device, according to an embodiment of the present disclosure.

Referring to FIGS. 1 and 11, in operation 310, the second device 2000 receives information regarding an additional screen according to an additional screen display request regarding the first device 1000. For example, the information regarding the additional screen may include location information, content information, and size information of the additional screen to be exposed on a surface of the first device 1000.

In operation 320, the second device 2000 obtains an image of the shape of the first device 1000 by using a camera. The second device 2000 may detect the location and angle of the first device 1000 by photographing the first device 1000 by using the camera, receive in real time an image of the shape of the first device 1000 captured using the camera, and periodically update the image of the shape of the first device 1000 by using the camera.

In operation 330, the second device 2000 determines a location on which the additional screen is to be displayed, based on the captured image of the shape of the first device 1000 and the information regarding the additional screen. The second device 2000 extracts the coordinates of the location of the first device 1000 and the angle of a screen of the first device 1000 by analyzing the shape of the first device 1000, and determines a specific location on the first device 1000 on which the additional screen is to be displayed, based on the coordinates of the location and the angle.

In operation 340, the second device 2000 displays the additional screen on the determined location. For example, the second device 2000 may display a watch screen on the first device 1000, and may display application folder icons at left and right sides of the watch screen.

In operation 350, the second device 2000 controls the additional screen to be linked to the first device 1000. The second device 2000 may control the additional screen to be linked to the first device 1000 according to a user input for the first device 1000 and a user input for the second device 2000. In this case, the user input for the first device 1000 may be input by performing a specific gesture, a touch input, a button input, or a voice input by a user, but is not limited thereto. The user input for the second device 2000 may be input by performing a camera recognition gesture, a touch input, a button input, or a voice input, but is not limited thereto. For example, when the first device 1000 receives touch information for a virtual application folder icon from the second device 2000, the first device 1000 transmits information regarding an additional screen related to the touched application folder to the second device 2000. Also, the second device 2000 displays, on a predetermined surface of the first device 1000, an additional screen related to an application folder received from the first device 1000.

Figure 12:
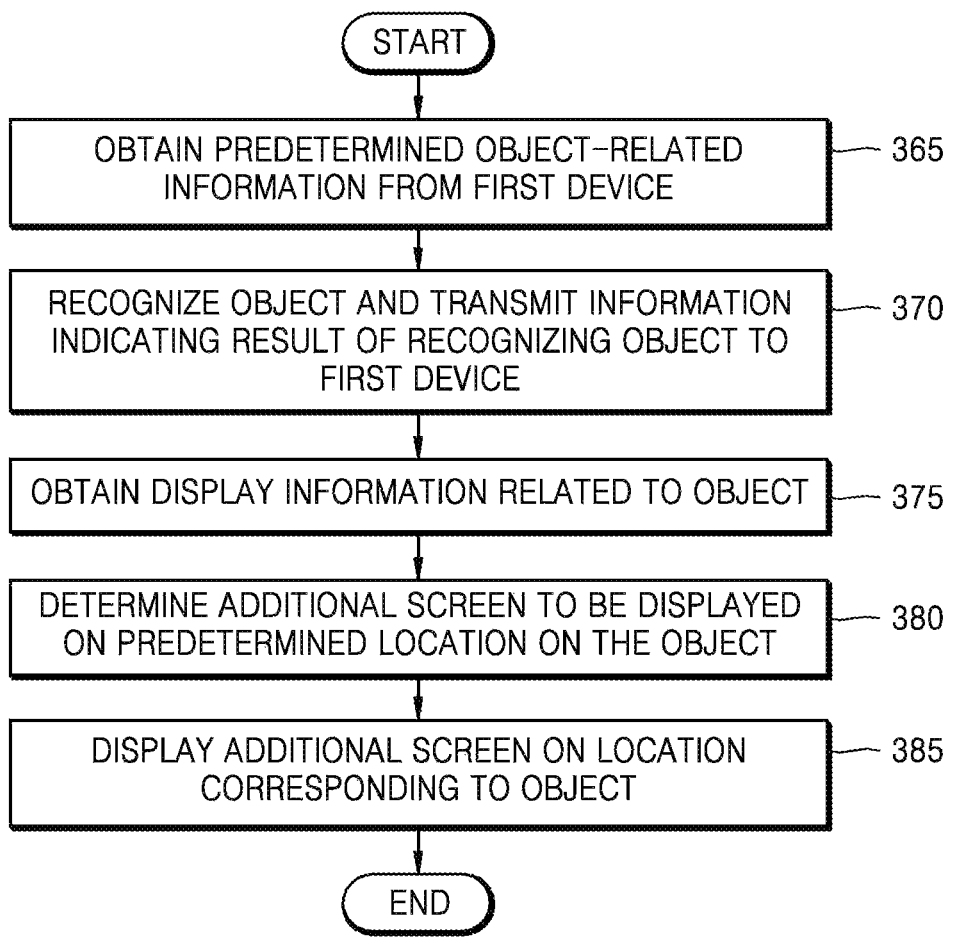
FIG. 12 is a flowchart of a method of processing a screen by using a first device that additionally includes an object, performed by a second device, according to an embodiment of the present disclosure.

FIG. 12 is a flowchart of a method of processing a screen, by using a first device which additionally includes an object, performed by a second device, according to an embodiment of the present disclosure.

Referring to FIGS. 1 and 12, in operation 365, the second device 2000 obtains predetermined object-related information from the first device 1000. For example, when an object is a band, the object-related information may be information regarding the shape or location of a band related to the first device 1000.

In operation 370, the second device 2000 recognizes the object using a camera, based on the object-related information, and transmits information indicating a result of recognizing the object to the first device 1000.

In operation 375, the second device 2000 obtains display information related to the object according to a screen display request, which is received from the first device 1000.

For example, the display information related to the object may include the location of an additional screen to be displayed on the object, the size of the additional screen, content information related to the additional screen, and shape information of the object captured using a camera.

In operation 380, the second device 2000 determines an additional screen to be displayed on a predetermined location on the object, based on the display information related to the object.

In operation 385, the second device 2000 displays the additional screen on a location corresponding to the object. According to an embodiment of the present disclosure, the second device 2000 may display the additional screen on the object 1000*a* related to the first device 1000. The second device 2000 may determine a location on which the additional screen is to be displayed, based on captured state information of the object 1000*a*. In a method of determining a location on which an additional screen is to be displayed according to an embodiment of the present disclosure, the second device 2000 may recognize state information of the object 1000*a* captured using a camera, extracts information regarding the coordinates of the location of and the angle of the object 1000*a* from the state information of the object 1000*a*, and determine a region on which the additional screen is to be displayed, based on the location and angle of the object 1000*a*.

In a method of processing a screen by using a first device according to an embodiment of the present disclosure, an object may be a natural object such as a human body part, white paper of a diary, and a calendar.

That is, the first device 1000 sets a human palm as a display region and informs the second device 2000 of information regarding the display region. The second device 2000 informs the first device 1000 of a recognition event when the human palm is recognized using a camera, and may display a virtual keyboard or a calendar in a region corresponding to the human palm according to a request for an additional screen from the first device 1000.

Figure 13:
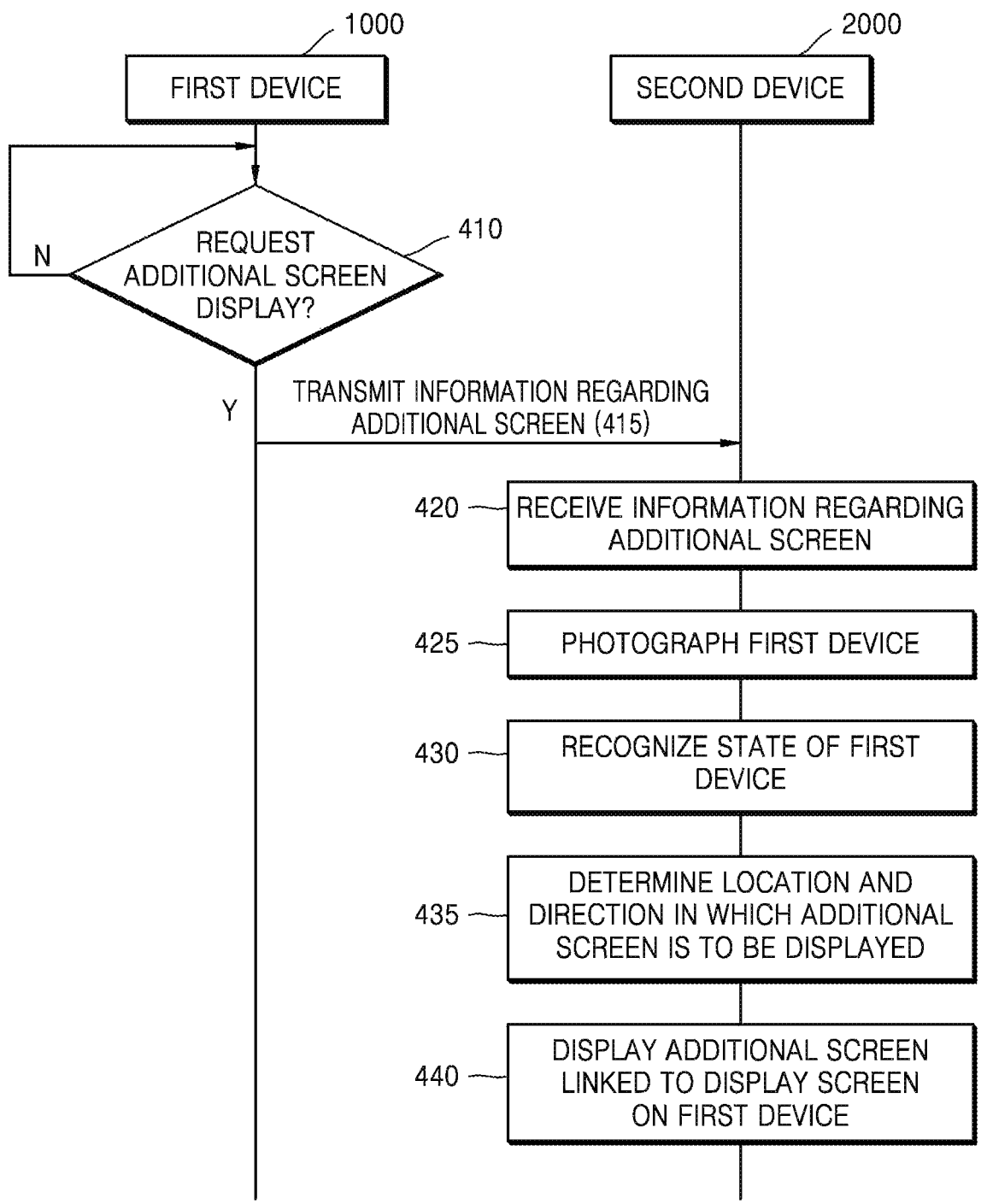
FIG. 13 is a flowchart of a method of displaying an additional screen to be linked to a screen displayed on a first device, performed by a second device, according to an embodiment of the present disclosure.

FIG. 13 is a flowchart of a method of displaying an additional screen to be linked to a screen displayed on a first device, performed by a second device, according to an embodiment of the present disclosure.

Referring to FIGS. 1 and 13, according to an embodiment of the present disclosure, the first device 1000 is a mobile device and the second device 2000 is an HMD.

In operation 410, the first device 1000 checks whether an additional screen display request related to a display screen thereof is received through a user input performed using a gesture, a touch, or voice is while the display screen is displayed on the first device 1000. According to an embodiment of the present disclosure, the additional screen may be a virtual image displayed on a screen of an HMD.

In operation 415, when it is determined that the additional screen display request is received, the first device 1000 transmits, to the second device 2000, information regarding the additional screen related to the display screen of the first device 1000 together with a triggering signal corresponding to the additional screen display request. For example, when a user wants to expand and view the display screen of the first device 1000, the first device 1000 may transmit the information regarding the additional screen to the second device 2000 while requesting the second device 2000 to display the additional screen.

In this case, the information regarding the additional screen may include shape information of the first device 1000, content information related to the additional screen, location information of the additional information to be displayed on the display screen of the first device 1000, image information related to the additional screen, and the size information of the additional screen. For example, when the first device 1000 is an e-book, the content information related to the additional screen may be a virtual table of contents of the e-books, the location information of the additional screen may be a right side of a screen of the e-book, and the size information of the additional screen may be substantially the same as the size information of a display screen on the e-book. Also, when a user selects the virtual table of contents of the e-book on the additional screen that is in the form of a virtual image, the location information of the additional screen may be a right side of a screen of the list of the virtual e-books on the e-book, and the size information of the additional screen may be 70% of the size of the screen of the virtual table of contents of the e-book.

In operation 420, the second device 2000 receives the additional screen display request and the information regarding the additional screen from the first device 1000.

In operation 425, when the second device 2000 receives information regarding an additional screen and the additional screen display request from the first device 1000, the second device 2000 photographs the shape of the first device 1000 by using a camera.

In operation 430, the second device 2000 recognizes the state of the first device 100 based on the shape of the first device 100 so as to determine a location on which the additional screen is to be displayed. In this case, information regarding the state of the recognized first device 1000 may include device type and the location and angle of the display screen.

In operation 435, the second device 2000 extracts information regarding the location and angle of a screen of the first device 1000 from the information regarding the state of the first device 1000, and determines a location and direction in which the additional screen is to be displayed on the first device 1000, based on the location and angle of the screen of the first device 1000 and the information regarding the additional screen. Information regarding the location and angle of the screen of the first device 1000 may be extracted using methods according to various embodiments of the present disclosure.

According to an embodiment of the present disclosure, the second device 2000 receives shape information of the first device 1000 from the first device 1000. The second device 2000 extracts feature points from the shape information of the first device. The second device 2000 determines the location of the displays screen on the first device 1000 by comparing feature points of an image of the first device 1000 captured using a camera with the feature points of the shape information of the first device. Also, the second device 2000 determines the angle of the display screen, based on the relationship between the feature points of the image of the first device 1000 and the feature points of the shape information. For example, the second device 2000 determines that the angle of the display screen on the first device 1000 exactly faces a front direction when the distances between four feature points at the four vertices of the first device 1000 are the same, and determines that the angle of the display screen is tilted when the distances between four feature points at the four vertices of the first device 1000 are not the same.

In operation 440, the second device 2000 displays the additional screen linked to the display screen on the first device 1000, based on the location of the display screen and information related to the additional screen. According to an embodiment of the present disclosure, the display screen on the first device 1000 and the additional screen are displayed on a glass screen of an HMD. Thus, a user may view the display screen on the first device 1000 and the additional screen via the second device 2000.

Figure 14:
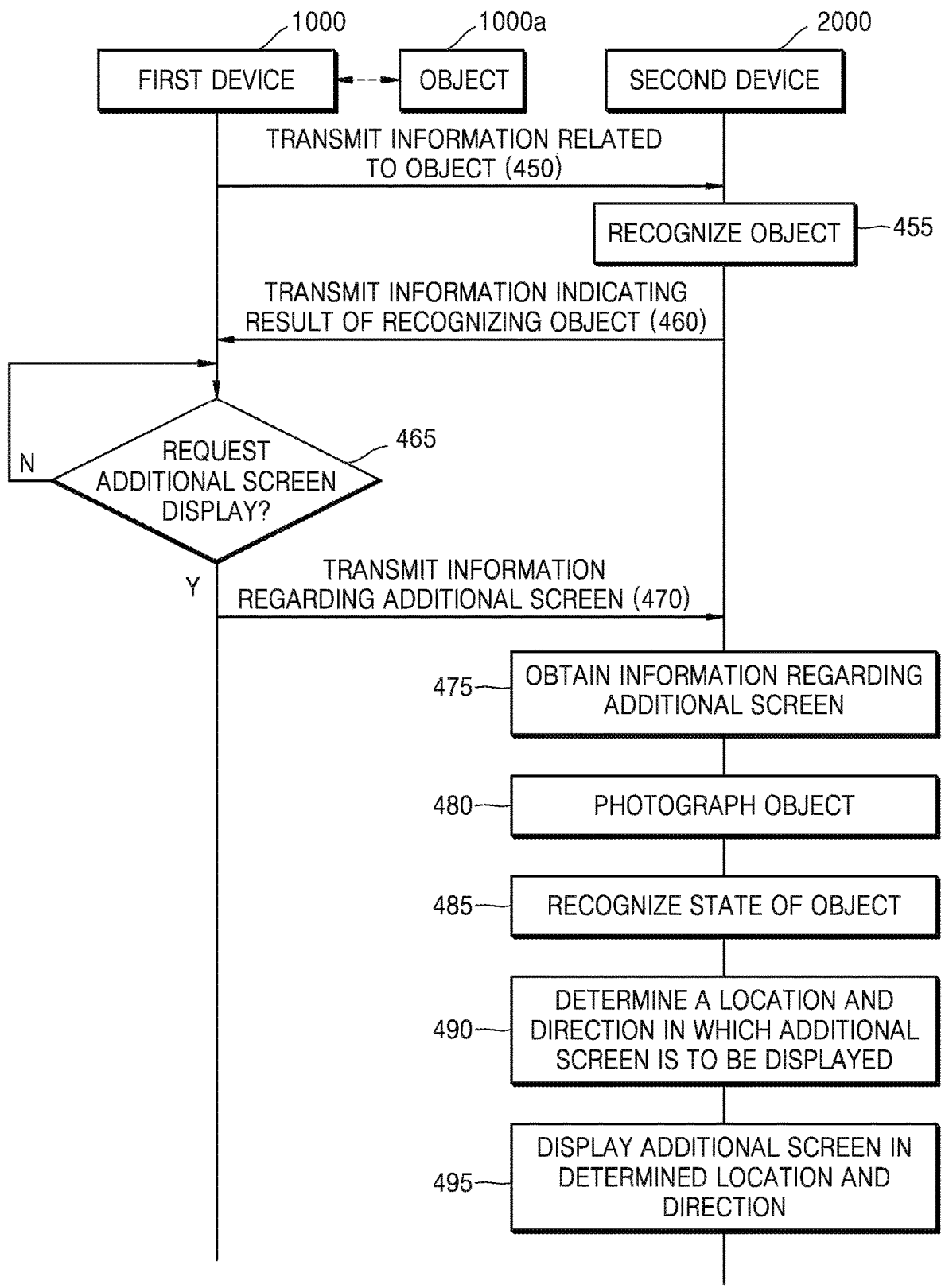
FIG. 14 is a flowchart of a method of displaying a screen to be linked to a screen displayed on a first device including an object, performed by a second device, according to an embodiment of the present disclosure.

FIG. 14 is a flowchart of a method of displaying a screen to be linked to a screen displayed on a first device including an object, performed by a second device, according to an embodiment of the present disclosure.

Referring to FIGS. 1 and 14, according to an embodiment of the present disclosure, the first device 1000 is a mobile device and the second device 2000 is an HMD. The first device 1000 additionally includes an object 1000*a* having limited functions or having no function as illustrated in FIG. 2. For example, the object 1000*a* may be a wrist band, a sticker, or a calendar. Otherwise, the object 1000*a* may be provided separately from the first device 1000.

In operation 450, the first device 1000 transmits information related to the object 1000*a*. The information related to the object 1000*a* may be shape information of or location information of the object 1000*a*. For example, when the object 1000*a* is a band, the information related to the object 1000*a* may be shape information or location information of the band.

In operation 455, when receiving the information related to the object 1000*a* from the first device 1000, the second device 2000 recognizes the shape of the object 1000*a* using a camera, based on the information related to the object 1000*a*. According to an embodiment of the present disclosure, when the object 1000*a* is a wrist band having no function, the first device 1000 cannot recognize a user's viewing of the wrist band and thus the second device 2000 may recognize the wrist band using the camera. However, when the object 1000*a* is a wrist band having limited functions, the first device 1000 is capable of recognizing a user's viewing of the wrist band and may thus directly request the second device 2000 to display an additional screen without performing a recognition operation. According to an embodiment of the present disclosure, when the first device 1000 sets a natural object, e.g., a human wrist, a diary, a calendar, etc., as a display region, the second device 2000 may recognize the natural object using the camera.

In operation 460, after the object 1000*a* is recognized using the camera, the second device 2000 transmits information indicating the result of recognizing the object to the first device 1000. According to an embodiment of the present disclosure, when a wrist band is recognized using the camera, the second device 2000 may inform the first device 1000 of a wrist band recognition event.

In operation 465, the first device 1000 checks an additional screen display request is received through a user input such as a user's motion, a touch, or voice while a screen is displayed on the first device 1000.

In operation 470, when it is determined that the additional screen display request is received, the first device 1000 transmits information regarding an additional screen thereof to the second device 200, together with a triggering signal corresponding to this request. For example, when a user wants to display a menu screen on the object 1000*a*, the first device 1000 may transmit a signal requesting to display the additional screen and the information regarding the additional screen to the second device 2000.

In this case, the information regarding the additional screen may include the contents of the additional screen, location information of the additional screen to be displayed on a predetermined location on the object 1000*a*, content information related to the additional screen, and the size of the additional screen. According to an embodiment of the present disclosure, the additional screen may be a virtual image displayed on a screen of an HID.

In operation 475, the second device 2000 obtains the additional screen display request and the information regarding the additional screen from the first device 1000.

In operation 480, when receiving the additional screen display request and the information regarding the additional screen regarding the first device 1000, the second device 2000 photographs the shape of the object 1000*a* using the camera.

In operation 485, the second device 2000 recognizes the state of the object 1000*a* based on the shape of the object 1000*a* so as to determine a location on which the additional screen is to be displayed. In this case, the recognized state of the object 1000*a* may include the location and angle of the object 1000*a*. For example, the second device 2000 may recognize the location and angle of a wrist band which is the object 1000*a*.

According to an embodiment of the present disclosure, the second device 2000 receives shape information of the object 1000*a* from the object 1000*a*. The second device 2000 extracts feature points from the shape information. The second device 2000 determines the location of the screen on the first device 1000 by comparing feature points of an image of the object 1000*a* captured using a camera with the feature points of the shape information of the object 1000*a*. Also, the second device 2000 determines the angle of the screen, based on the relationship between the feature points of the image of the object 1000*a* and the feature points of the shape information. For example, the second device 2000 determines that the angle of the object 1000*a* exactly faces a front direction when the distances between four feature points at the four vertices of the object 1000*a* are the same, and determines that the angle of the object 1000*a* is tilted when the distances between four feature points at the four vertices of the object 1000*a* are not the same.

In operation 490, the second device 2000 extracts the coordinates of the location of the object 1000*a* and the angle of the object 1000*a* from the state information of the object 1000*a*, and determines a location and direction in which the additional screen is to be displayed, based on received information related to the additional screen and the location and angle of the object 1000*a*.

In operation 495, the second device 2000 displays the additional screen in the determined location and direction of the object 1000*a*, based on the determined location of the object 1000*a* and the information related to the additional screen.

Figure 15:
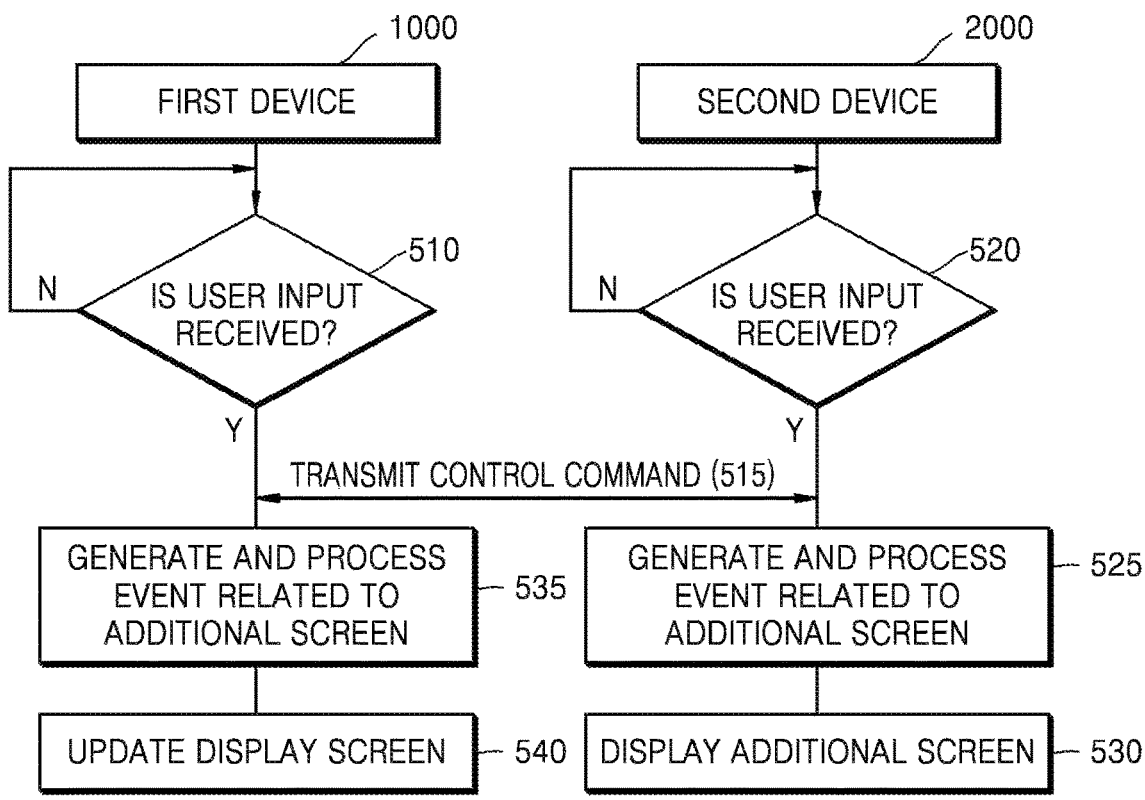
FIG. 15 is a flowchart of a method of controlling an additional screen, performed by a second device, according to an embodiment of the present disclosure.

FIG. 15 is a flowchart of a method of controlling an additional screen, performed by a second device, according to an embodiment of the present disclosure.

Referring to FIGS. 1 and 15, according to an embodiment of the present disclosure, the first device 1000 is a mobile device and the second device 2000 is an HMD. The additional screen may be a virtual image displayed on a screen of an HMD.

In operation 510, the first device 1000 checks whether a first user input is received through a gesture, a touch, or voice.

In operation 515, when the first user input is received, the first device 1000 transmits a control command to the second device 2000 according to the first user input.

In operation 525, the second device 2000 generates and processes an event related to displaying of an additional screen, which corresponds to the first user input.

In operation 530, the second device 2000 displays the additional screen after the event related to displaying of an additional screen is processed.

In operation 520, the second device 2000 checks whether a second user input such as a virtual touch gesture or voice is performed on the additional screen.

In operation 515, the second device 2000 transmits a control command to the first device 1000 according to the second user input.

In operation 535, the first device 1000 generates and processes an event related to displaying of an additional screen, which corresponds to the second user input.

In operation 540, the first device 1000 updates the display screen after the event related to displaying of an additional screen is processed. For example, when the second device 2000 selects an additional screen of a specific menu by virtually touching the additional screen, the first device 1000 update and display the selected additional screen of the specific menu.

Figure 16:
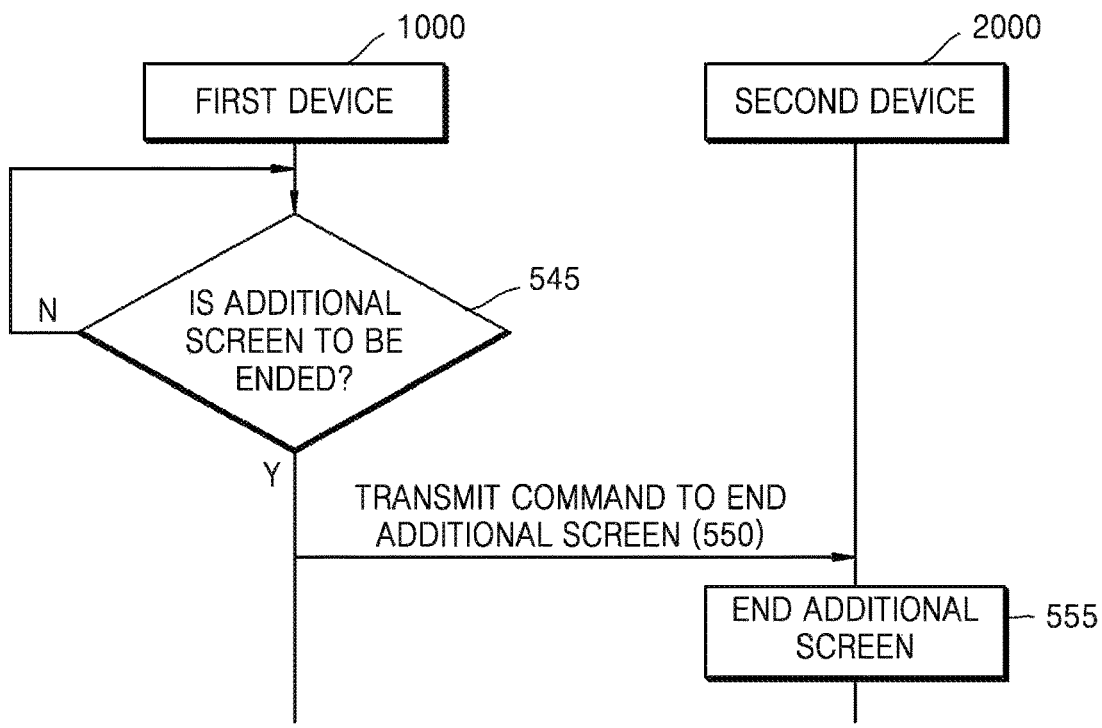
FIG. 16 is a flowchart of a method of controlling an additional screen to be ended, performed by a first device, according to an embodiment of the present disclosure.

FIG. 16 is a flowchart of a method of controlling an additional screen on a second device to be ended, performed by a first device, according to an embodiment of the present disclosure.

Referring to FIGS. 1 and 16, according to an embodiment of the present disclosure, the first device 1000 is a mobile device and the second device 2000 is an HMD.

In operation 545, the first device 1000 checks whether a command to end an additional screen is received through a user input. In this case, the user input for the first device 1000 may be a specific gesture input, a touch input, a button input, or a voice input, but is not limited thereto.

In operation 550, the first device 1000 transmits a command to end the additional screen to the second device 2000.

In operation 555, the second device 2000 ends the additional screen according to the command to end the additional screen, which is received from the first device 1000.

Figure 17:
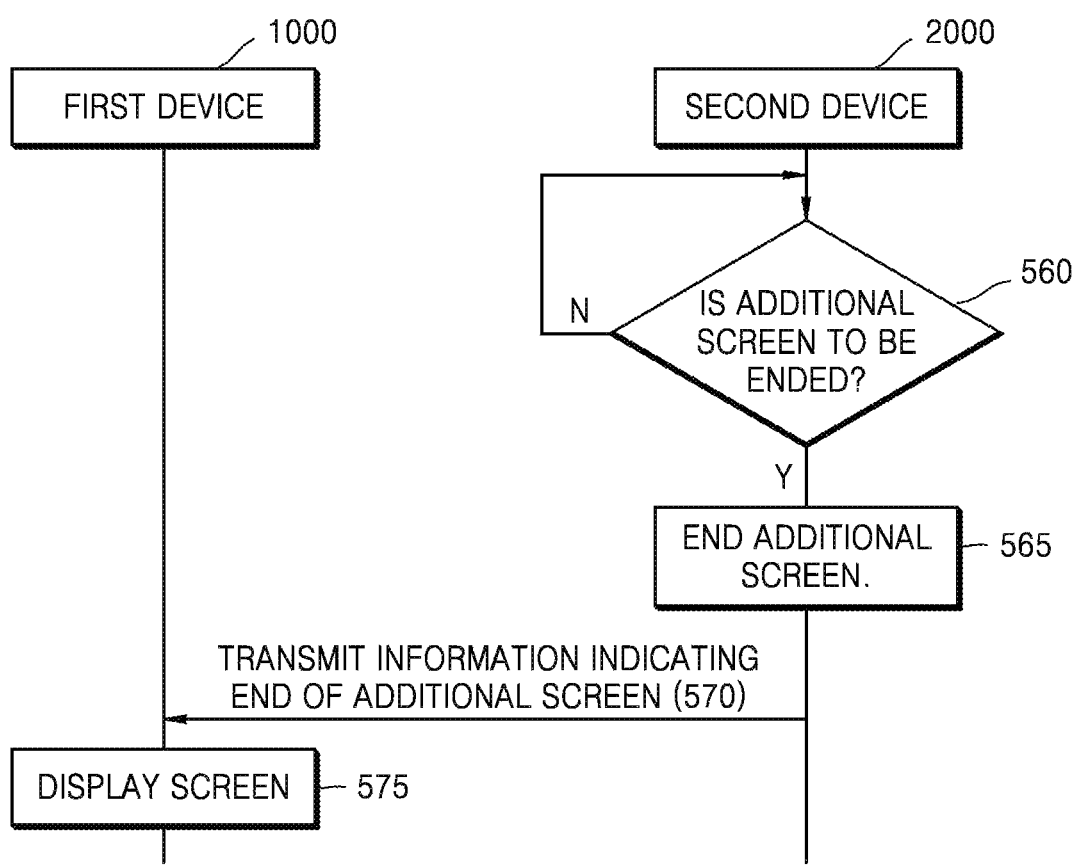
FIG. 17 is a flowchart of a method of controlling an additional screen to be displayed on a first device, performed by a second device, according to an embodiment of the present disclosure.

FIG. 17 is a flowchart of a method of controlling a display screen on a first device, performed by a second device, according to an embodiment of the present disclosure.

Referring to FIGS. 1 and 17, according to an embodiment of the present disclosure, the first device 1000 is a mobile device and the second device 2000 is an HMD.

In operation 560, the second device 2000 checks, by using a camera, whether a command to end an additional screen is input through a virtual gesture or voice. According to an embodiment of the present disclosure, the command to end the additional screen may be input by selecting a menu on the additional screen or the additional screen by performing a touch gesture, selecting a region outside the additional screen, or performing a specific gesture, e.g., drawing an 'X'.

In operation 565, when the command to end the additional screen is received, the second device 2000 ends the additional screen.

In operation 570, the second device 2000 transmits information indicating the end of the additional screen to the first device 1000. In this case, the information indicating the end of the additional screen may include at least one among a video signal, an audio signal, and a haptic signal.

In operation 575, the first device 1000 displays a screen thereon according to the information indicating the end of the additional screen, which is received from the second device 2000.

Figure 18A:
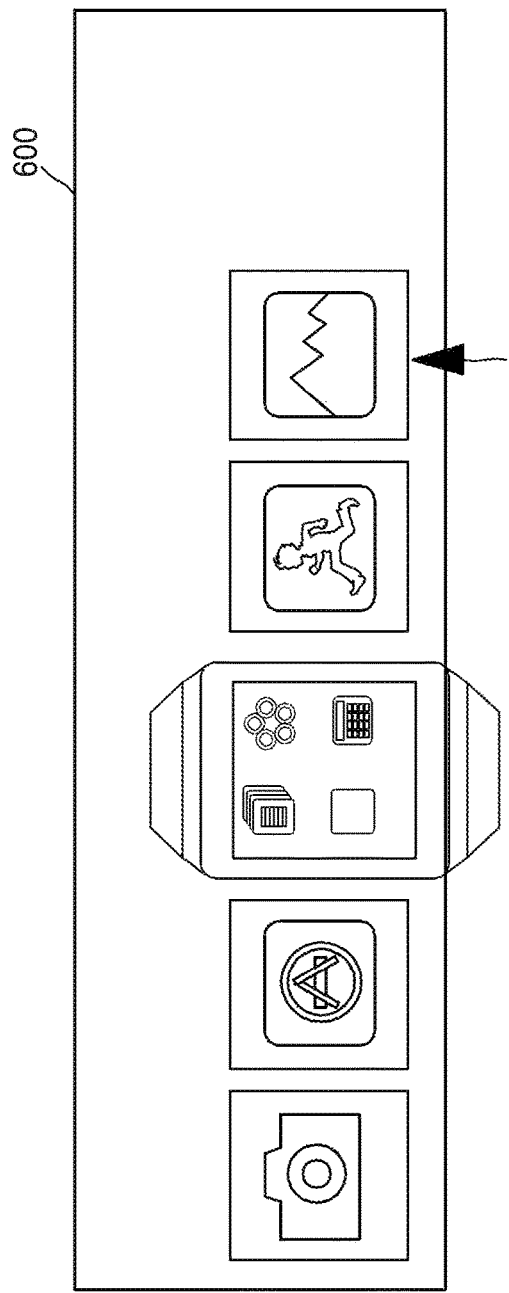
FIGS. 18A and 18B are diagrams illustrating a method of displaying a virtual image type additional screen near a display screen on a first device and controlling the additional screen, performed by a second device, according to various embodiments of the present disclosure.
Figure 18B:
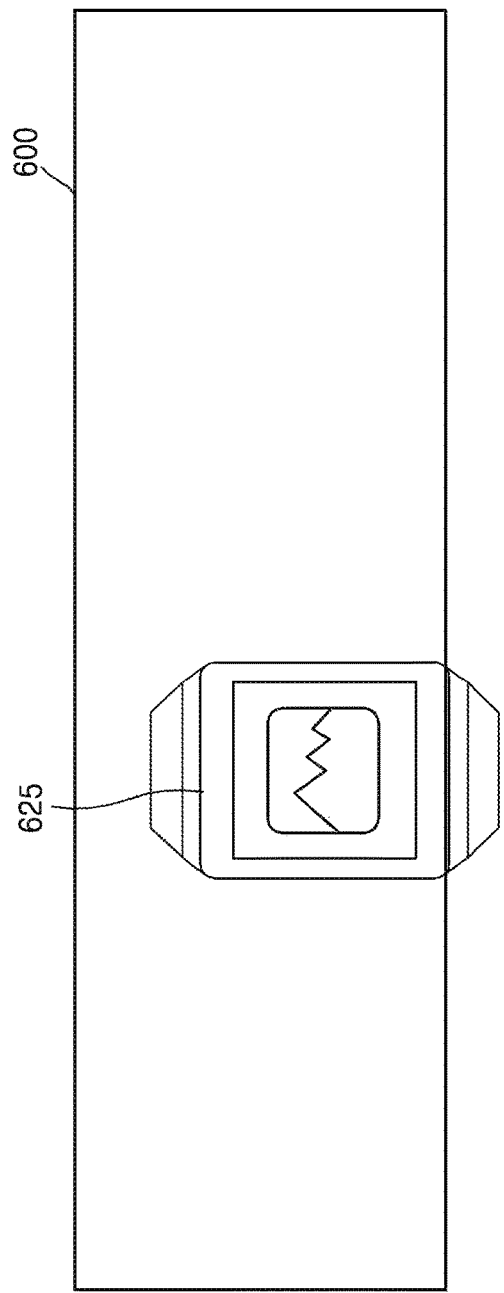

FIGS. 18A and 18B are diagrams illustrating a method of displaying virtual image type additional screens around a display screen on a first device and controlling the additional screens, performed by a second device, according to various embodiments of the present disclosure.

Referring to FIGS. 1, 18A, and 18B, according to an embodiment of the present disclosure, the first device 1000 is a wrist type terminal and the second device 2000 is an HMD device.

Referring to FIG. 18A, an additional screen including at least one menu image is displayed on the second device 2000 to be linked to a screen displayed on the first device 1000. Reference numeral 600 denotes a glass screen of the second device 2000.

When the second device 2000 recognizes, by using a camera, a virtual touch gesture or voice that is input on a 'Gallery' menu 610 corresponding to the additional screen, the second device 2000 transmits a user input corresponding to selecting of the additional screen to the first device 1000.

Referring to FIG. 18B, the first device 1000 may display a 'Gallery' menu 625 corresponding to the selected additional screen according to the user input received from the second device 2000.

Figure 19A:
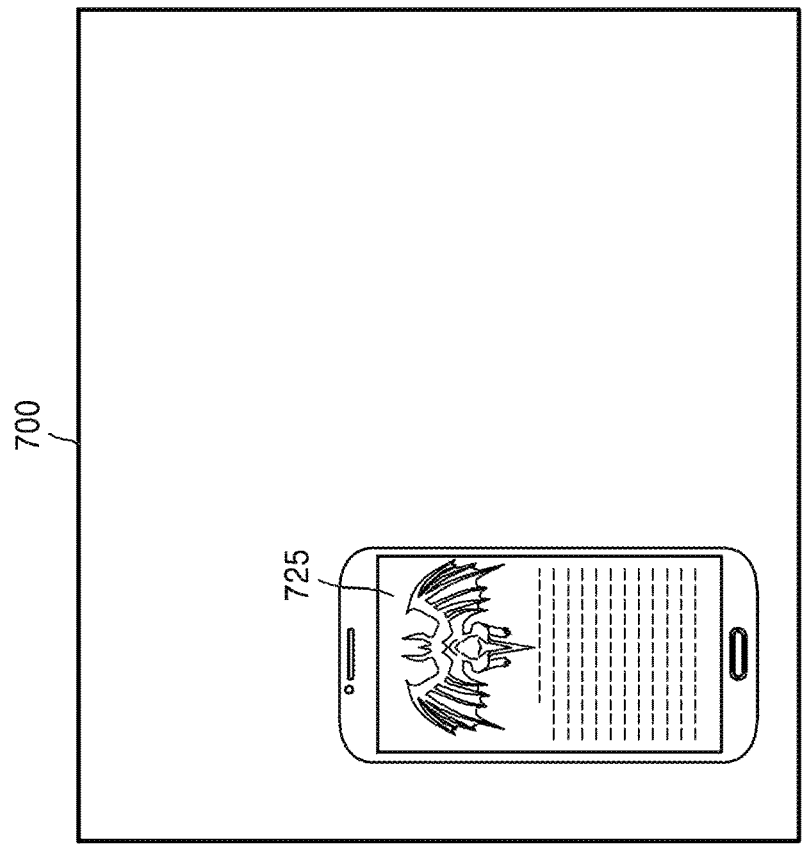
FIGS. 19A and 19B are diagrams illustrating a method of displaying a virtual image type additional screen near a display screen on a first device and controlling the additional screen, performed by a second device, according to various embodiments of the present disclosure.
Figure 19B:
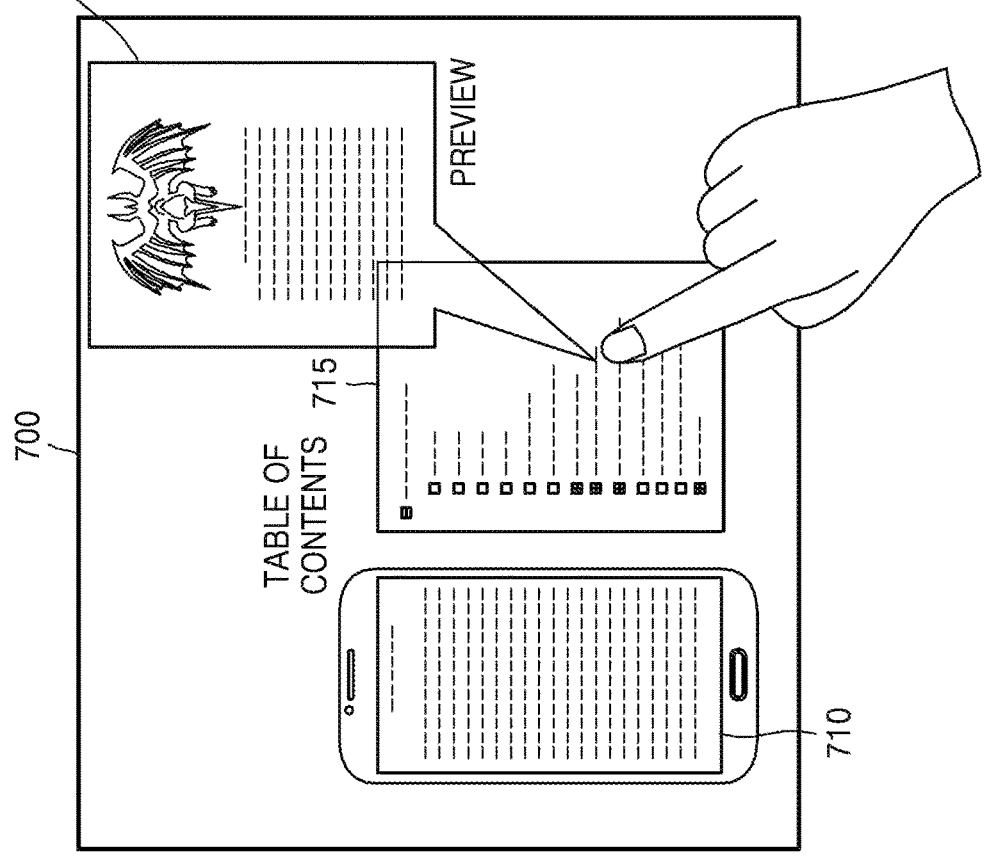

FIGS. 19A and 19B are diagrams illustrating a method of displaying a virtual image type additional screen near a display screen on a first device and controlling the additional screens, performed by a second device, according to various embodiments of the present disclosure.

Referring to FIGS. 1, 19A, and 19B, according to an embodiment of the present disclosure, a first device 710 is an e-book terminal and the second device 2000 is an HMD device.

Referring to FIG. 19A, an additional screen including at least one virtual image is displayed on the second device 2000 to be linked to a display screen on an e-book terminal 710. A reference numeral 700 denotes a glass screen region of the second device 2000. Here, the display screen of the e-book terminal 710 is an actual screen viewed via a lens of the HMD device, and additional screens 715 and 720 displayed on the second device 2000 are virtual images viewed near the display screen on the e-book terminal 710 via a display unit of the HMD device.

When the second device 2000 recognizes, by using a camera, a user input performed on the additional screen 715 which is a table of contents through a virtual touch gesture or voice, the second device 2000 displays an additional screen 720 corresponding to a preview image. When the additional screen 720 which is the preview image is selected through a virtual touch gesture or voice, the second device 2000 transmits a selection signal corresponding to the selected additional screen to the e-book terminal 710.

Referring to FIG. 19B, the e-book terminal 710 may display a display screen 725 corresponding to the preview image thereon according to a user input received from the second device 2000.

Figure 20:
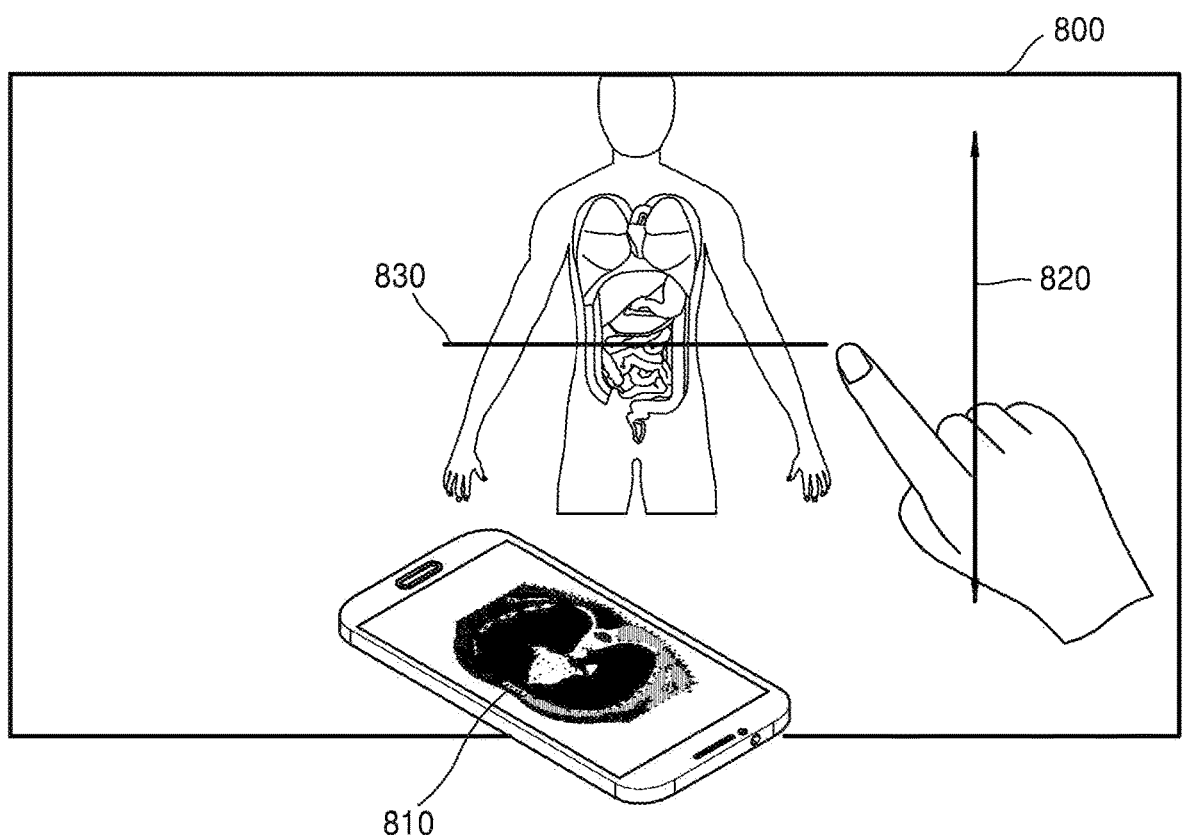
FIG. 20 is a diagram illustrating a method of displaying a three-dimensional (3D) image type additional screen around a display screen on a first device and controlling the additional screen, performed by a second device, according to an embodiment of the present disclosure.

FIG. 20 is a diagram illustrating a method of displaying three-dimensional (3D) image type additional screens near a display screen on a first device and controlling the additional screens, performed by a second device, performed by a second device according to an embodiment of the present disclosure.

Referring to FIGS. 1 and 20, according to an embodiment of the present disclosure, a first device 810 is a tablet terminal and the second device 2000 is an HID device.

Referring to FIG. 20, the second device 2000 displays a 3D AR screen at various angles to be linked to a display screen displayed on a tablet terminal 810. A reference numeral 800 denotes a glass screen on the second device 2000.

The second device 2000 recognizes a motion 820 of a user's finger on an AR additional screen (e.g., a human-body screen) by using a camera. The second device 2000 moves the location of an image 830 of a cross-section of a human body displayed on the tablet terminal 810 according to the motion 820. The user of the second device 2000 may select a portion of the image 830 corresponding to the cross-section of the human body while moving the location of his/her finger.

When an additional screen corresponding to the cross-section of the human body is selected by moving the user's finger, the second device 2000 transmits a selection signal to the tablet terminal 810.

Accordingly, as illustrated in FIG. 20, the tablet terminal 810 may display an image corresponding to the cross-section of the human body to be selected according to the selection signal received from the second device 2000.

Figure 21:
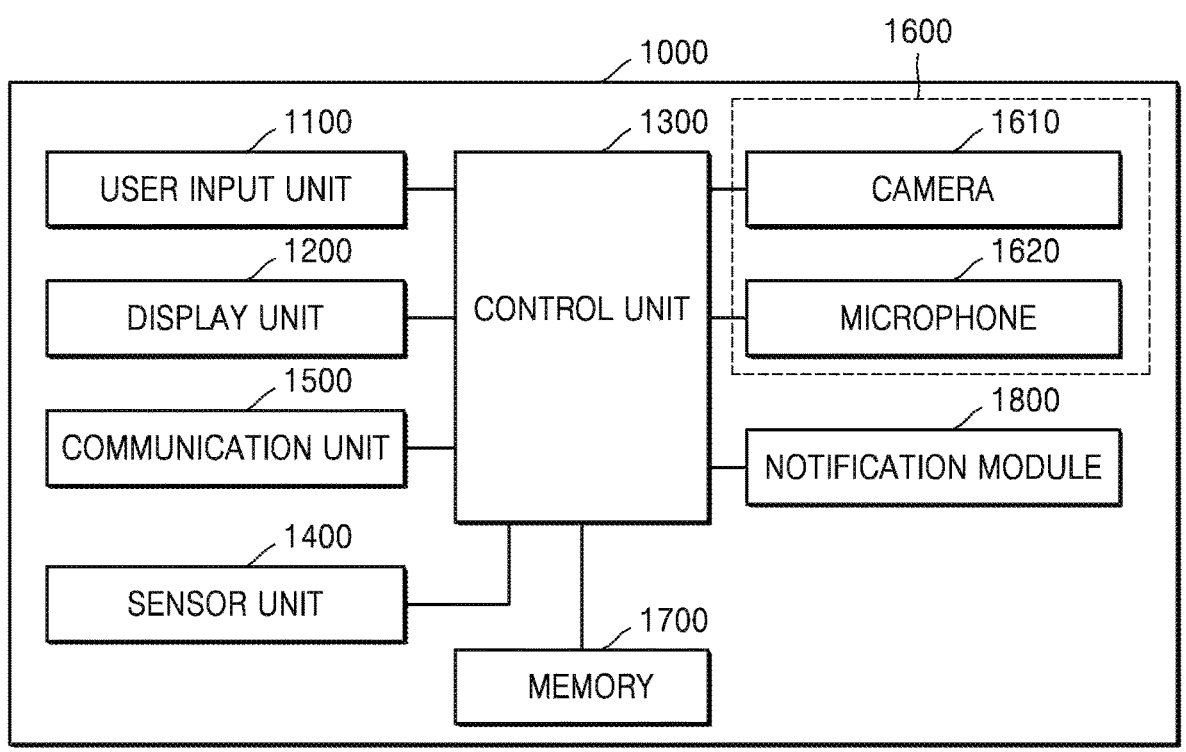
FIG. 21 is a block diagram of a first device according to an embodiment of the present disclosure.

FIG. 21 is a block diagram of a first device according to an embodiment of the present disclosure.

Referring to FIG. 21, the first device 1000 may include a user input unit 1100, a display unit 1200, a control unit 1300, a sensor unit 1400, a communication unit 1500, an audio/video (A/V) input unit 1600, a memory 1700, and a notification module 1800.

The user input unit 1100 means a unit configured for a user to input data for controlling the first device 1000. For example, examples of the user input unit 1100 may include, but are not limited to, a key pad, a dome switch, a touch pad (a touch-type capacitive touch pad, a pressure-type resistive overlay touch pad, an infrared sensor type touch pad, a surface acoustic wave conduction touch pad, an integration type tension measurement touch pad, a piezo effect type touch pad, etc.), a jog wheel, a jog switch, etc.

The user input unit 1100 may receive a user input instructing to display an additional screen from the second device 2000 of FIG. 1.

The display unit 1200 displays information processed by the first device 1000. For example, the display unit 1200 may display a user interface such as a menu.

In general, the control unit 1300 controls overall operations of the first device 1000. For example, the control unit 1300 may generally control the user input unit 1100, the display unit 1200, the sensor unit 1400, the communication unit 1500, and the A/V input unit 1600 by executing programs stored in the memory 1700.

In more detail, the control unit 1300 may control the communication unit 1500 to control displaying of the additional screen through a user input such as a gesture, a touch, or voice. The first device 1000 may select a menu according to a user input and generate a command to display an additional screen related to the menu. The control unit 1300 may request the second device 2000 to display the additional screen, and process a screen according to a control command corresponding to a user input received from the second device 2000. The control unit 1300 may provide the second device 2000 with an additional screen display request and information related to the additional screen. For example, the information related to additional screen may include a location on which the additional screen is to be displayed, contents related to the additional screen, and the size of the additional screen. Also, the control unit 1300 may update information related to a display screen, based on control information regarding the additional screen received from the second device 20000.

The sensor unit 1400 may sense the state of the first device 1000 or the state of the vicinity of the first device 1000, and transmit information containing a result of sensing the state of the first device 1000 or the state of the vicinity of the first device 1000 to the control unit 1300.

The sensor unit 1400 may include at least one among a geomagnetic sensor, an acceleration sensor, a temperature/humidity sensor 1430, an infrared sensor 1440, a gyroscope sensor, a position sensor (e.g., a GPS), a proximity sensor, and a red, green, and blue (RGB) sensor (an illuminance sensor).

The communication unit 1500 may include at least one element configured to establish communication between the first device 1000 and the second device 2000.

Also, the communication unit 1500 may control the second device 2000 to display the additional screen, and exchange information for changing an operation of the additional screen with the second device 2000.

The A/V input unit 1600 is configured to input an audio signal or a video signal, and may include a camera 1610, a microphone 1620, etc. The camera 1610 may obtain image frames such as still images or videos via an image sensor in a video call mode or a shooting mode. An image captured by the image sensor may be processed using the control unit 1300 or an additional image processor (not shown).

An image frame processed by the camera 1610 may be stored in the memory 1700 or transmitted to the outside via the communication unit 1500. The microphone 1620 receives an external sound signal and converts it into electrical voice data. For example, the microphone 1620 may receive a sound signal from an external device or a speaker. The microphone 1620 may employ various noise removal algorithms for removing noise generated when an external sound signal is input to the microphone 1620.

The memory 1700 may store a program for processing and control operations of the control unit 1300, and store data input to or output from the first device 1000 (e.g., location information of an additional screen to be linked to the display screen on the first device 1000, content information related to the additional screen, size information of the additional screen, etc.).

The notification module 1800 may generate a signal informing an event related to the additional screen of the first device 1000. Examples of the event related to the additional screen generated by the first device 1000 may include receiving a call signal, receiving a message, inputting a key signal, informing a schedule, etc. The notification module 1800 may output this signal in the form of a video signal via the display unit 1200.

Figure 22:
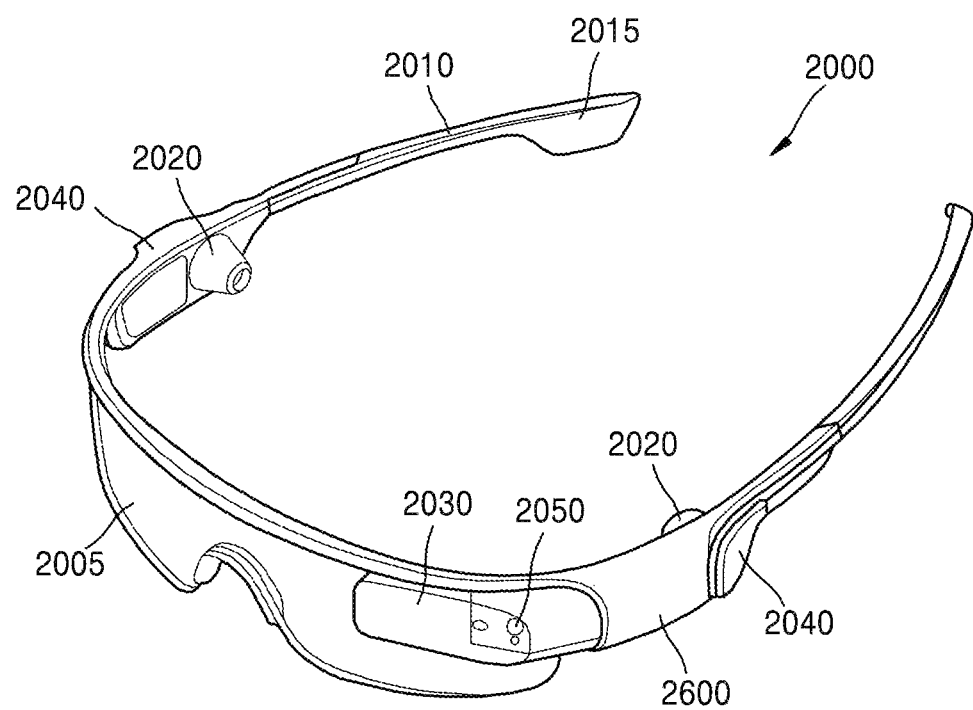
FIG. 22 illustrates the exterior of a second device according to an embodiment of the present disclosure.

FIG. 22 illustrates the exterior of a second device according to an embodiment of the present disclosure.

FIG. 22 illustrates a case in which the second device 2000 is an eyeglass type HMD device.

Although a frame 2010 of the HMD device illustrated in FIG. 22 is an all-in-one type, the shape and structure of a frame of a HMD device introduced in the present disclosure is not limited to those of the frame illustrated in FIG. 22.

For example, referring to FIG. 22, the frame 2010 of the HMD device may include a connecting member (not shown) and thus at least a portion of the frame 2010 may be foldable. For example, an HMD device according to an embodiment of the present disclosure includes the foldable frame 2010 and may be thus folded in storage when the HMD device is not in use by a user, thereby minimizing a space occupied by the HMD device.

An HMD device according to an embodiment of the present disclosure may further include an elastic band (not shown) allowing the HMD device to be fixedly put on a user's head, regardless of the size of the user's head.

According to an embodiment of the present disclosure, the frame 2010 may be configured such that a lens 2005 is attachable to or detachable from the frame 2010. According to an embodiment of the present disclosure, a HMD device may not include the lens 2005. Also, the lens 2005 illustrated in FIG. 22 is integrally formed with a nose bridge but various embodiments of the present disclosure are not limited to that shown in FIG. 22. For example, a nose bridge of an HMD device according to an embodiment of the present disclosure may be integrally formed with the frame 2010.

The lens 2005 may be formed of a transparent material so that a user may view an actual space via the lens 2005. The lens 2005 may be formed of a material that passes light, which forms an image to be displayed a display unit 2030, there through. Examples that may be used to form the lens 2010 include plastic such as polycarbonate or glass but are not limited thereto.

The control unit 2600 may be connected to the HMD device in a wired or wireless manner. Although FIG. 22 illustrates that the control unit 2600 is located at a left side of the frame 2010, various embodiments of the present disclosure, are not limited thereto. For example, the control unit 2600 may be located at a right side of the frame 2010 or located on a front surface of the HMD device to be adjacent to a camera 2050.

The control unit 2600 may receive data from, for example, the camera 2050 or user input units 2040, analyze the received data, and generate information to be transmitted to a user of the HMD device via at least one of the display unit 2030 and an audio output unit 2020. The information to be transmitted to the user may include at least one among an image, a text, a video, and audio but is not limited thereto.

The camera 2050 may be included in the display unit 2030 or may be located on the frame 2010, separately from the display unit 2030. The camera 2050 may be a camera that is used in smart phones or a small-sized camera such as webcams. For example, the camera 2050 may be mounted on a location determined beforehand to be appropriate for obtaining an image by making a gesture using a user's hand. For example, as illustrated in FIG. 22, the camera 2050 may be mounted on a location adjacent to a user's eyes when the user wears the HMD device and be thus capable of capturing an image to be substantially the same as that recognized through the user's eyes.

The user input unit 2040 may include, but is not limited to, at least one of a touch pad that may be operated by a user's finger and a button that may be operated through a push operation. Although FIG. 22 illustrates that the user input units 2040 are disposed at sides of the frame 2010, the user input units 2040 may be located on another location on the HMD device.

The user input units 2040 are configured to receive a user input. The user input may include data or a signal that is input by a user to generate an event causing the HMD device to start or end a predetermined operation.

For example, the user input units 2040 may include an 'on'/' off switch to power on or off the HMD device. Also, the user input unit 2040 according to an embodiment of the present disclosure may receive a user input for controlling an image displayed using the HMD device.

The display unit 2030 may be located on a left upper end of the lens 2005 and configured using a semi-transparent optical waveguide (e.g., a prism) as illustrated in FIG. 22. The display unit 2030 illustrated in FIG. 22 may reflect light output from a projector built in the HMD device to focus an image on the foveae of the retinas of the eyes of a user who wears the HMD device. However, the display unit 2030 included in the HMD device according to an embodiment of the present disclosure is not limited to that shown in FIG. 22, and may be configured according to various methods and in various structures to display an image near a user's eyes. For example, according to an embodiment of the present disclosure, the display unit 2030 may be a transparent display or a non-transparent display.

Although not shown in FIG. 22, according to an embodiment of the present disclosure, the HMD device may further include a microphone (not shown). The microphone may receive a user's voice, sound in an ambient environment of the HMD device, etc.

The sound output unit 2020 may be configured in the form of an earphone to be mounted on the ears of a user of the HMD device. The sound output unit 2020 may be fixedly mounted on the HMD device as illustrated in FIG. 22 but various embodiments of the present disclosure are not limited thereto. For example, the sound output unit 2020 may be configured to be attachable to or detachable from the HMD device, so that a user of the HMD device may selectively put the sound output unit 2020 on his or her ears. For example, the sound output unit 2020 may be a bone conduction speaker.

A power supply unit 2015 is illustrated as being provided on an end portion of the frame 2010 of the HMD device. However, various embodiments of the present disclosure are not limited thereto and the power supply unit 2015 may be disposed on various locations on the frame 2010 of the HMD device. The power supply unit 2015 supplies power for operating the HMD device to the elements of the HMD device. Although not shown, the power supply unit 2015 may include a battery for charging, and a cable or a cable port via which power may be received from the outside.

Figure 23:
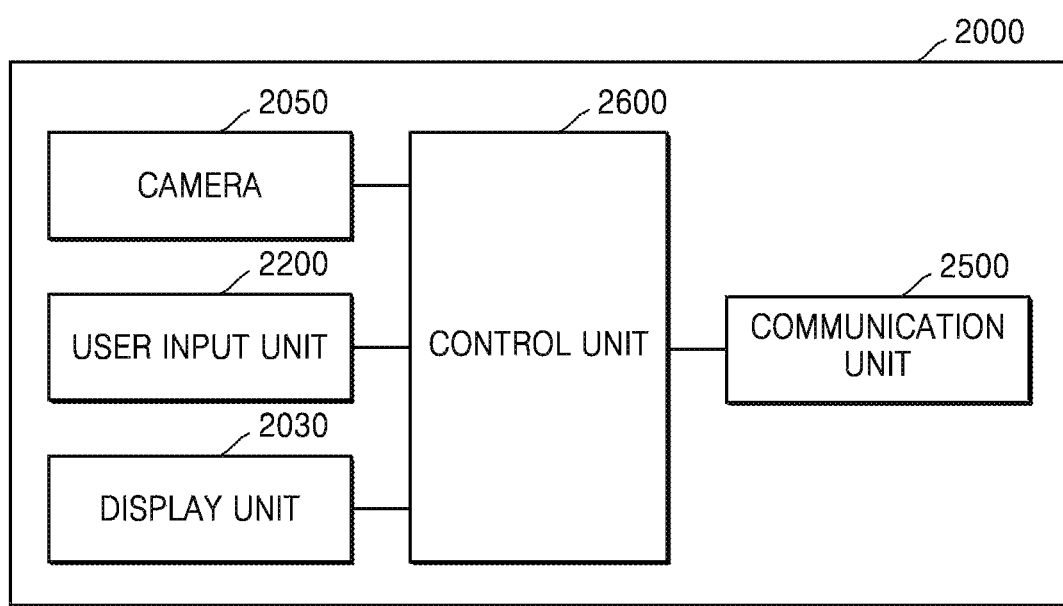
FIGS. 23 and 24 are block diagrams of second devices according to various embodiments of the present disclosure.
Figure 24:
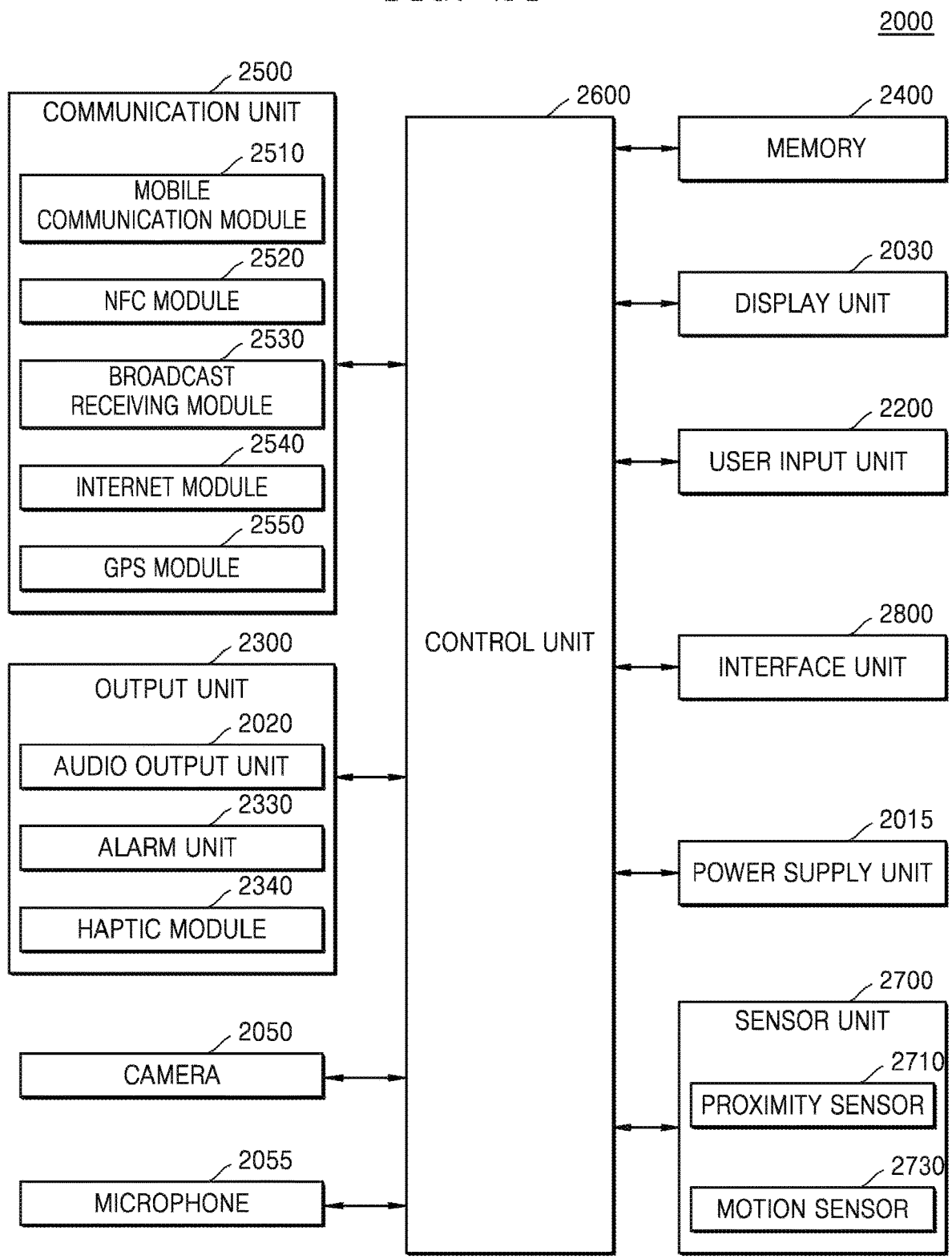

FIGS. 23 and 24 are block diagrams of second devices according to various embodiments of the present disclosure.

FIGS. 23 and 24 illustrate cases in which the second devices are eyeglass-type HMD devices.

Referring to FIG. 23, the HMD device 2000 according to an embodiment of the present disclosure, includes at least a camera 2050, a user input unit 2200, a display unit 2030, a communication unit 2500, and a control unit 2600.

However, all of the elements illustrated in FIG. 23 are not indispensable elements of the HMD device 2000. The HMD device may further include other elements or may include only some of the elements illustrated in FIG. 23.

For example, referring to FIG. 24, the HMD device 2000 according to an embodiment of the present disclosure may further include a microphone 2055, an output unit 2300, a memory 2400, a sensor unit 2700, and an interface unit 2800, in addition to the camera 2050, the user input unit 2200, the display unit 2030, the communication unit 2500, and the control unit 2600.

The camera 2050 is configured to photograph an object in an actual space. An image of the object captured by the camera 2050 may be a moving picture image or continuous still images. The HMD device may be, for example, an eyeglass-type device having a communication function and a data processing function. The camera 2050 facing the front of a user when the user wears the HMD device may photograph an object in an actual space.

According to an embodiment of the present disclosure, the camera 2050 is configured to photograph the first device 1000 of FIG. 1, an object related to the first device 1000, or a user's gesture. For example, the camera 2050 may obtain information regarding a part of a user's body or information regarding the user's gesture. The information regarding the part of the user's body may include an image of the part of the user's body. The information regarding the user's gesture may include an image obtained by photographing a body part of the user who makes the gesture.

Two or more cameras 2050 may be provided according to an embodiment of the second device 2000.

The microphone 2055 receives an external sound signal and converts it into electrical voice data in a call mode, a recording mode, a voice recognition mode, etc. In the call mode, the electrical voice data may be converted and output into a form that may be transmitted to a mobile communication base station via a mobile communication module 2510. The microphone 2055 may employ various noise removing algorithms to remove noise generated when an external sound signal is input to the microphone 2055.

The user input unit 2200 receives a user input for controlling the HMD device 2000. The user input unit 2200 may receive a touch input and a key input performed on the HMD device 2000. Also, the user input unit 2200 may receive a user's gesture photographed by the camera 2050 from the camera 2050.

The display unit 2030 displays information regarding an additional screen of a virtual image processed by the control unit 2600 of the HMD device 2000 to a user.

According to an embodiment of the present disclosure, the display unit 2030 may display an additional screen of a virtual image on a predetermined location on a display screen displayed on the first device 1000.

Also, according to an embodiment of the present disclosure, the display unit 2030 may display an additional screen of a virtual image on a predetermined location on an object related to the first device 1000.

Also, the display unit 2030 may display a user interface for selecting an additional screen of a virtual image processed by the control unit 1600.

The display unit 2030 may include (not shown) at least one among a touch screen, electronic paper, a liquid crystal display (LCD), a thin-film transistor-LCD (TFT-LCD), a light-emitting diode (LED), an organic LED (OLED), a flexible display, a 3D display, and a transparent display.

The output unit 2300 is configured to output an audio signal, a video signal, or an alarm signal. The output unit 2300 may include an audio output unit 2020, an alarm unit 2330, a haptic module 2340, etc.

The audio output unit 2020 outputs audio data received from the communication unit 2500 or control unit 2600 or stored in the memory 2400 in a call signal receiving mode, a call mode, a recording mode, a voice recognition mode, a broadcast receiving mode, etc. Also, the sound output unit 2020 outputs an audio signal related to a function performed by the HMD device 2000, e.g., a call-signal receiving sound, a message receiving sound, etc. The audio output unit 2020 may include a speaker, a buzzer, etc.

The alarm unit 2330 outputs a signal informing an additional screen-related event of the HMD device 2000. Examples of the additional screen-related event generate by the HMD device 2000 include receiving of a call signal, receiving a message, inputting of a key signal, etc. The alarm unit 2330 outputs a signal informing the additional screen-related event in a form different from an audio signal or a video signal. When a call signal or a message is received, the alarm unit 2330 may output a signal informing this fact. Also, when a key signal is input, the alarm unit 2330 may output a signal as a feedback of the inputting of the key signal. A user may recognize that the additional screen-related event occurs by checking the signal output from the alarm unit 2330. Alternatively, in the HMD device 2000, the signal informing the occurrence of the additional screen-related event may be output via the display unit 2030 or the sound output unit 2020.

The haptic module 2340 generates various haptic effects that a user may feel. A representative example of haptic effects generated by the haptic module 2340 may be a vibration effect. When the haptic module 2340 generates vibration as a haptic effect, the intensity and pattern of the vibration generated by the haptic module 2340 may be converted and different vibrations may be synthesized and output or may be sequentially output.

In addition to vibration, the haptic module 2340 may generate various haptic effects, e.g., an effect using a stimulus caused by a vertical movement of an arrangement of pins on a contact skin surface, an effect using a stimulus caused by a jet force of air jetted from a nozzle or a suction force of air sucked through an air-inlet, an effect using a stimulus caused when a skin surface is brushed, an effect using a stimulus caused when an electrode is contacted, an effect using a stimulus caused by an electrostatic force, an effect achieved when a sense of cold or heat is generated using a material capable of sucking heat or generating heat, etc. The haptic module 2340 may be configured such that a haptic effect is not only delivered when haptic module 2340 is directly touched but also is felt through the sensation of a user's muscle such as a finger or an arm.

The memory 2400 may store a program for processing and control operations of the control unit 2600, and temporarily store data that is input or output (e.g., message, still images, video, location information of an additional screen to be linked to the display screen of the first device 1000, content information related to the additional screen, size information of the additional screen, etc.).

The memory 2400 may include at least one storage medium among a flash memory type memory, a hard disk type memory, a multimedia card micro type memory, a card type memory, a random access memory (RAM), and a read-only memory (ROM). Also, the memory 2400 may include a web storage that has a storage function and that is operated in the Internet.

The communication unit 2500 receives information related to an additional screen from the first device 1000, and exchanges, with the first device 1000, information required for the HMD device 2000 to display the additional screen on the display unit 2030 and to change the displayed additional screen, based on the information related to additional screen. According to an embodiment of the present disclosure, the communication unit 2500 may exchange required information with peripheral devices or a server.

The communication unit 2500 may include a mobile communication module 2510, a near-field communication (NFC) module 2520, a broadcast receiving module 2530, an Internet module 2540, a GPS module 2550, etc.

The mobile communication module 2510 exchanges a radio signal with at least one among a base station, an external terminal, and a server in a mobile communication network. Here, the radio signal may include a voice call signal, a video call signal, or various types of data to be used when text/multimedia messages are exchanged. Thus, the HMD device 2000 may exchange a voice call signal, a video call signal, or a text/multimedia message with an external device.

The NFC module 2520 means a module configured to establish NFC.

NFC technologies may include BLUETOOTH™, radio-frequency identification (RFID), infrared data association (IrDA), ultra wideband (UWB), ZIGBEE™, etc.

The broadcast casting module 2530 is configured to receive a broadcast signal by using various broadcasting systems, and particularly, digital multimedia broadcasting-terrestrial (DMB-T), a digital multimedia broadcasting-satellite (DMB-S), media forward link only (MediaFLO), digital video broadcasting-handheld (DVB-H), integrated services digital broadcast-terrestrial (ISDB-T), etc. Also, the broadcast casting module 2530 may be configured to be suitable for not only such digital broadcasting systems but also other various broadcasting systems capable of providing a broadcast signal.

The Internet module 2540 means a module configured to access a wireless Internet and may be installed inside or outside the second device 2000. Wireless local area network (WLAN), wireless broadband (Wibro), world interoperability for microwave access (Wimax), high-speed downlink packet access (HSDPA), etc. may be used as wireless Internet technology.

The GPS module 2550 may receive location information from a plurality of GPS satellites.

The sensor unit 2700 senses a current state of the HMD device 2000, e.g., the location of the HMD device 2000, whether the HMD device 2000 is touched by a user, etc., and generates a sensing signal for controlling an operation of the HMD device 2000. For example, the sensor unit 2700 may perform a sensing function related to whether the interface unit 2800 is coupled to an external device, etc.

The sensor unit 2700 may include a proximity sensor 2710, a motion sensor 2730, etc. The proximity sensor 2710 may detect whether an object is approaching the HMD device 2000 or is present near the HMD device 2000 without a physical contact. The proximity sensor 2710 may detect an object that is approaching or is present near the HMD device 2000 by checking a change in an alternating magnetic field or a static magnetic field, a rate of change in an electrostatic capacitance, etc.

The motion sensor 2730 senses the location or motion of the second device 2000 by using an acceleration sensor, a gyro sensor, etc. The acceleration sensor is a device capable of converting a change in acceleration in a direction into an electrical signal, and has been widely used as micro-electromechanical systems (MEMS) technology has advanced. The gyro sensor is a sensor that is configured to measure an angular speed and may sense a direction deviating from a reference direction.

The interface unit 2800 acts as an interface with all of external devices connected to the HMD device 2000. Examples of external devices connected to the HMD device 2000 include a wire/wireless headset, an external charger, a wire/wireless data port, a card socket for a memory card, a subscriber identification module (SIM) card, a user identity module (UIM) card, etc., an audio input/output (I/O) terminal, a video I/O terminal, an earphone, etc. The interface unit 2800 may receive data or power from such an external device, deliver the data or power to the elements included in the HMD device 2000, and transmit data stored in the HMD device 2000 to an external device.

The power supply unit 2015 supplies power for operating the HMD device 2000 to the elements of the HMD device 2000. Although not shown, the power supply unit 2015 may include a battery for charging, and a cable or a cable port via which power may be received from the outside.

In general, the control unit 2600 controls overall operations of the HMD device 2000. For example, the control unit 2600 may execute programs stored in the memory 2400 to control the display unit 2030, the camera 2050, the user input unit 2200, the output unit 2300, and the communication unit 2400.

The HMD device 2000 may be connected to the first device 1000, and display an additional screen of a virtual image on a screen of the HMD device 2000 by receiving information regarding the additional screen of the virtual image from the first device 1000. According to an embodiment of the present disclosure, the HMD device 2000 may be connected to a server (not shown).

The control unit 2600 may receive the information regarding the additional screen of the virtual image and information regarding a location on the display unit 2030 of the HMD device 2000 on which the additional screen is to be displayed from the first device 1000 via the communication unit 2500.

According to an embodiment of the present disclosure, the control unit 2000 may photograph the shape of the first device 1000 by using the camera 2050, determine a location on which the additional screen of the virtual image is to be displayed based on information regarding the shape of the first device 1000 and the information regarding the additional screen, display the additional screen of the virtual image near a display screen on the first device 1000, and control the additional screen of the virtual image to be linked to the display screen on the first device 1000.

In this case, the control unit 2600 may extract information regarding the location and angle of a screen on the first device 1000 from information regarding the shape of the first device 1000, and determine a region in which the additional screen of the virtual image is to be displayed, based on the location and angle of a screen on the first device 1000. For example, the control unit 2600 may determine the location and angle of the screen on the first device 1000 by receiving information regarding the shape of the first device 1000 from the first device 1000, extracting feature points from the information regarding the shape of the first device 1000, and comparing feature points of an image of the first device 1000 captured by the camera 2050 with the feature points of the information regarding the shape of the first device 1000.

Also, according to an embodiment of the present disclosure, the control unit 2600 may control an additional screen of the HMD device 2000 linked to a display screen on the first device 1000 according to a user input performed on the first device 1000 and a user input performed using the camera 2050 of the HMD device 2000. Also, the control unit 2600 may recognize a user input on the additional screen through the camera 2050, ends the additional screen when the user input is recognized, and transmit information indicating the end of the additional screen to the first device 1000.

The HMD device 2000 may display an additional screen on a screen thereof without being connected to the first device 1000.

In this case, the control unit 2600 photographs the first device 1000 in an actual space by using the camera 2050. The control unit 2600 may photograph the first device 1000 in the actual space in real time or a predetermined cycle.

Also, according to an embodiment of the present disclosure, the control unit 2600 determines additional screens to be displayed around a captured image of the first device 1000. In this case, the control unit 2600 may display a user interface for selecting an additional screen on a screen of the HMD device 2000, and select a specific additional screen, based on a user input received via the user input unit 2200 or the camera 2050.

Also, the control unit 2600 may determine a location in the vicinity of the first device 1000, on which an additional screen is to be displayed.

According to an embodiment of the present disclosure, since an additional screen is displayed using the HMD device 2000, a limited screen of the first device 1000 may be expanded and a large amount of visual information and a convenient low-level interaction may be provided.

An embodiment of the present disclosure may be embodied in the form of a non-transitory computer-readable recording medium having recorded thereon computer-executable instructions, e.g., a program module that may be executed using a computer. Examples of the non-transitory computer-readable recording medium may include not only an arbitrary available recording medium that is accessible by a computer but also volatile and non-volatile recording media, and separable/non-separable recording media. Also, examples of the non-transitory computer-readable recording medium may include computer storage media and communication media. The computer storage media include the volatile and non-volatile recording media and separable and non-separable recording media which are manufactured according to an arbitrary method or technology to store information such as computer-readable instructions, data structures, program modules or other data. The communication media generally include computer-readable instructions, data structures, program modules, other data of modulated data signals, other transmission mechanisms, and arbitrary information transfer media.

In the present disclosure, the term 'unit' may be understood as including a hardware component (such as a processor or a circuit) and/or a software component executed by a hardware component such as a processor.

It should be understood that various embodiments described herein should be considered in a descriptive sense only and not for purposes of limitation. Descriptions of feature points or aspects within each embodiment of the present disclosure, should typically be considered as available for other similar feature points or aspects in other various embodiments. For example, elements described as being included in a single unit may be dispersed. Similarly, elements described as being dispersed may be combined in a single unit.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of displaying a virtual screen, performed by a glass type head-mounted display (HMD) device, the method comprising:
    obtaining, through a camera of the HMD device, an image of an object in an actual space;
    identifying the object in the actual space based on the obtained image;
    outputting, through a projector of the HMD device, light related to a virtual screen including a plurality of virtual objects based on the identified object such that, in a user's view, the virtual screen is displayed on the identified object;
    obtaining an input for selecting a virtual object among the plurality of virtual objects included in the virtual screen, the input including at least one of a gesture or a voice; and
    based on the obtained input, outputting, through the projector of the HMD device, light for information related to the selected virtual object.

2. The method of claim 1, wherein the identifying the object in the actual space comprises obtaining information related to the object in the actual space from an electronic device and identifying the object in the actual space based on the obtained information.

3. The method of claim 2, wherein the electronic device comprises the object in the actual space.

4. The method of claim 2, wherein the electronic device is a cloud.

5. The method of claim 2, wherein the electronic device is the HMD device.

6. The method of claim 1, wherein the object in the actual space is either a wrist band or a sticker having limited functions or having no function.

7. The method of claim 1, wherein the object in the actual space is a nature object.

8. The method of claim 1, wherein the virtual screen comprises a virtual watch image.

9. The method of claim 1, wherein the virtual object comprises at least one icon.

10. The method of claim 9, wherein the input comprises an input for selecting the at least one icon.

11. The method of claim 1, further comprising:
    obtaining a screen display request in response to the identifying of the object in the actual space,
    wherein the outputting of the light for information related to the selected virtual object comprises outputting the light in response to obtaining the screen display request.

12. A glass type head-mounted display (HMD) device for displaying a virtual screen, the HMD device comprising:
    a camera;
    a projector;

a waveguide to deliver light output from the projector toward an eye of a user of the HMD device; and at least one processor configured to:
- control to obtain, through the camera of the HMD device, an image of an object in an actual space,
- identify the object in the actual space based on the obtained image,
- control to output, through a projector of the HMD device, light related to a virtual screen including a plurality of virtual objects based on the identified object such that, in a user's view, the virtual screen is displayed on the identified object,
- obtain an input for selecting a virtual object among the plurality of virtual objects included in the virtual screen, the input including at least one of a gesture or a voice, and
- based on the obtained input, control to output, through the projector of the HMD device, light for information related to the selected virtual object.

13. The HMD device of claim 12, wherein the at least one processor is further configured to obtain information related to the object from an electronic device and identify the object based on the obtained information.

14. The HMD device of claim 13, wherein the electronic device comprises the object in the actual space.

15. The HMD device of claim 13, wherein the electronic device is a cloud.

16. The HMD device of claim 13, wherein the electronic device is the HMD device.

17. The HMD device of claim 12, wherein the object in the actual space is either a wrist band or a sticker having limited functions or having no function.

18. The HMD device of claim 12, wherein the object in the actual space is a nature object.

19. The HMD device of claim 12, wherein the virtual screen comprises a virtual watch image.

20. A non-transitory computer-readable recording medium having recorded thereon at least one program including instructions for performing a method of displaying a virtual screen, performed by a glass type head-mounted display (HMD) device, the method comprising:
- obtaining, through a camera of the HMD device, an image of an object in an actual space;
- identifying the object in the actual space based on the obtained image;
- outputting, through a projector of the HMD device, light related to a virtual screen including a plurality of virtual objects based on the identified object such that, in a user's view, the virtual screen is displayed on the object;
- obtaining an input for selecting a virtual object included in the virtual screen, the input including at least one of a gesture or a voice; and
- based on the obtained input, outputting, through the projector of the HMD device, light for information related to the selected virtual object.

* * * * *